US005821913A

United States Patent [19]

Mamiya

[11] Patent Number: 5,821,913

[45] Date of Patent: Oct. 13, 1998

[54] METHOD OF COLOR IMAGE ENLARGEMENT IN WHICH EACH RGB SUBPIXEL IS GIVEN A SPECIFIC BRIGHTNESS WEIGHT ON THE LIQUID CRYSTAL DISPLAY

[75] Inventor: Johji Mamiya, Kunitachi, Japan

[73] Assignee: International Business Machines Corporation, Armonk, N.Y.

[21] Appl. No.: 572,554

[22] Filed: Dec. 14, 1995

[30] Foreign Application Priority Data

Dec. 14, 1994 [JP] Japan .................................... 6-310858

[51] Int. Cl.[6] ............................. G09G 3/36; G09G 5/26; G09G 5/10; H04N 1/393

[52] U.S. Cl. ............................ 345/88; 345/130; 345/149; 358/451

[58] Field of Search ............................... 345/88, 89, 127, 345/128, 130, 132, 147, 149, 22, 23, 150, 152, 153, 155; 358/451, 525, 521; 382/298, 299, 300, 301; 395/139

[56] References Cited

U.S. PATENT DOCUMENTS

| | | | |
|---|---|---|---|
| 4,642,628 | 2/1987 | Murata | 345/88 |
| 4,743,963 | 5/1988 | Abuyama | 358/451 |
| 5,208,871 | 5/1993 | Eschbach | 358/456 |
| 5,229,762 | 7/1993 | Itoh et al. | 345/153 |
| 5,245,678 | 9/1993 | Eschbach et al. | 358/455 |
| 5,334,996 | 8/1994 | Tanigaki et al. | 345/136 |
| 5,349,451 | 9/1994 | Dethardt | 358/451 |
| 5,351,137 | 9/1994 | Kato et al. | 358/457 |
| 5,418,626 | 5/1995 | Semasa | 358/451 |
| 5,426,723 | 6/1995 | Horsley | 395/139 |
| 5,459,477 | 10/1995 | Fukuda et al. | 382/298 |
| 5,465,168 | 11/1995 | Koden et al. | 359/56 |

*Primary Examiner*—Steven J. Saras
*Assistant Examiner*—Paul A. Bell
*Attorney, Agent, or Firm*—Ronald L. Drumheller

[57] ABSTRACT

A method and apparatus is provided for displaying an enlarged image on a liquid crystal display apparatus capable of displaying colors, and in particular, a liquid crystal display method and apparatus that can enlarge an image at an arbitrary ratio and display the outline of the enlarged image smoothly. On a display panel of a color liquid crystal display apparatus in which display dots each comprising an array of three subpixels displaying red (R), green (G), and blue (B) are arranged in a matrix, three pieces of raw-direction original display brightness data to be displayed in three subpixels are extended and subjected to predetermined weights of brightness to form enlarged display brightness data. This data is sequentially output to the subpixels to extend the original image in the raw direction of the display panel before display.

12 Claims, 18 Drawing Sheets

FIG.15

| LINE NUMBER | ORIGINAL DATA | ENLARGEMENT (A') | (B') | (C') | | TOTAL BRIGHTNESS |
|---|---|---|---|---|---|---|
| $n_a$ | 1 | $\frac{1}{6}$ | | | = | $\frac{1}{6}$ |
| $n_a+1$ | 1 | 1 | | | = | 1 |
| $n_a+2$ | 1 | $\frac{1}{6}$ + | $\frac{5}{6}$ | | = | 1 |
| $n_a+3$ | | | $\frac{3}{6}$ + | $\frac{3}{6}$ | = | 1 |
| $n_a+4$ | | | | $\frac{5}{6}$ | = | $\frac{5}{6}$ |
| ⋮ | | | ⋮ | | | |

FIG.16

| LINE NUMBER | CONVENTIONAL METHOD | PRESENT METHOD | ORIGINAL DATA |
|---|---|---|---|
| $n_a$ | | $\frac{1}{6}$ | 1 |
| $n_a+1$ | 1 | 1 | 0 |
| $n_a+2$ | $\frac{1}{3}$ | $\frac{1}{6}$ | 1 |
| $n_a+3$ | $\frac{1}{3}$ | $\frac{3}{6}$ | 0 |
| $n_a+4$ | 1 | $\frac{5}{6}$ | ⋮ |
| $n_a+5$ | 0 | 0 | |
| $n_a+6$ | $\frac{2}{3}$ | $\frac{5}{6}$ | |
| $n_a+7$ | $\frac{2}{3}$ | ⋮ | |
| ⋮ | ⋮ | | |

| Γ CONVERSION | | $\Gamma^{-1}$ CONVERSION | |
|---|---|---|---|
| GRADATION | BRIGHTNESS | BRIGHTNESS | GRADATION |
| 0 | 0 | 0 | 0 |
| 1 | 0 | 1 | 5 |
| 2 | 0 | 2 | 5 |
| 3 | 0 | 3 | 6 |
| 4 | 1 | 4 | 6 |
| 5 | 1 | 5 | 7 |
| 6 | 3 | 6 | 7 |
| 7 | 5 | 7 | 8 |
| 8 | 7 | 8 | 8 |
| 9 | 10 | 9 | 9 |
| 10 | 12 | 10 | 9 |
| 11 | 12 | 11 | 10 |
| 12 | 13 | 12 | 10 |
| 13 | 13 | 13 | 12 |
| 14 | 15 | 14 | 14 |
| 15 | 15 | 15 | 15 |

| BRIGHTNESS | GRADATION | | | | |
|---|---|---|---|---|---|
| | 10° | 5° | 0° | -5° | -10° |
| 0 | 0 | 0 | 0 | 0 | 0 |
| 1 | 3 | 4 | 5 | 5 | 5 |
| 2 | 4 | 5 | 5 | 7 | 8 |
| 3 | 4 | 5 | 6 | 7 | 8 |
| 4 | 5 | 6 | 6 | 8 | 9 |
| 5 | 5 | 6 | 7 | 8 | 9 |
| 6 | 6 | 6 | 7 | 8 | 10 |
| 7 | 6 | 7 | 8 | 9 | 10 |
| 8 | 6 | 7 | 8 | 9 | 10 |
| 9 | 7 | 8 | 9 | 10 | 11 |
| 10 | 7 | 8 | 9 | 10 | 11 |
| 11 | 8 | 9 | 10 | 10 | 12 |
| 12 | 8 | 9 | 10 | 11 | 12 |
| 13 | 10 | 11 | 12 | 12 | 13 |
| 14 | 13 | 13 | 14 | 14 | 14 |
| 15 | 15 | 15 | 15 | 15 | 15 |

METHOD OF COLOR IMAGE ENLARGEMENT IN WHICH EACH RGB SUBPIXEL IS GIVEN A SPECIFIC BRIGHTNESS WEIGHT ON THE LIQUID CRYSTAL DISPLAY

BACKGROUND OF THE INVENTION

1. Field of the Invention

The present invention relates to a liquid crystal display method and apparatus, and in particular, to a method and apparatus for enlarging images in a liquid crystal display apparatus capable of displaying colors.

2. Related Art

Dot matrix display apparatuses represented by liquid crystal display apparatuses each include several types of display apparatuses with different resolutions, that is, different numbers of pixels. Thus, if display data displayed on a display apparatus with a low resolution and a small number of pixels is directly displayed on a display apparatus with a high resolution and a large number of pixels, the data may appear in only part of the display area of the high-resolution display apparatus, resulting in a degraded display quality. In such a case, the original display data is enlarged using some method before display on the high-resolution display apparatus.

In addition, an image (including characters) may have to be enlarged within the same display screen, no matter what the number of available pixels is, and the original display data is also enlarged in such a case.

For example, assume that display data to be displayed on a color liquid crystal display apparatus with 640 dots/line (a single dot comprises red (R), green (G), and blue (B) subpixels) and 480 lines is enlarged and displayed on a high-density color liquid crystal display apparatus with 1,024 dots/line and 768 lines.

In this case, enlarging original display data 5/4 (1.25) times results in 800 dots/line and 600 lines, enlarging the data 3/2 (1.5) times results in 960 dots/line and 720 lines, and enlarging the data 8/5 (1.6) times enables the display of an image all over the display panel of the high-density color display apparatus with 1,024 dots/line and 768 lines.

The following methods have conventionally been used to enlarge original display data.

First, the simplest method enlarges data by copying specified pieces of data to their respective adjacent bits (that is, doubling these pieces of data) according to an enlargement ratio and then shifting the data. For example, if data is enlarged 4/3 (1.33) times in the raw direction and if six pieces of original data are arranged in dots n1 to n6 as shown in FIG. 23, every dot in the original data with a number that is a multiple of three is copied to its adjacent dot and the data is sequentially shifted, thereby achieving the target enlargement ratio. That is, the data in dot n3 is copied to dot n4, the original data in dots n4 to n6 is then shifted to n5 to n7, and the data in dot n7 (dot n6 in the original data) is then copied to dot n8, thereby obtaining eight pieces of data n1 to n8. In this manner, the original data in six dots is enlarged into enlarged display data in eight dots. In this figure, a number attached to each dot indicates the gradation (or brightness) of that dot; in this example, the gradation (brightness) of each dot thus increases monotonously from left to right.

In this method, however, every dot in the original data with a number that is a multiple of three is actually enlarged twice, and the other pieces of data are not changed. The enlarged image obtained may have a geometry differing from that of the original image in terms of the details in the raw direction, resulting in a significantly degraded display quality. In particular, if the gradation varies according to the dots as shown in FIG. 23, the viewer may feel that the enlarged image differs markedly from the original image.

An image enlarged-display method has thus been used wherein original data is enlarged in such a way that the brightness distribution in a screen after image enlargement is similar to that before enlargement as described in, for example, Published Unexamined Patent Application No. 4-147311 filed by the applicant on Dec. 21, 1992.

This display method generates medium values to enlarge display data according to the following equations:

$$H0=L0$$

$$H1=(1/3)L0+(2/3)L1$$

$$H2=(2/3)L1+(1/3)L2$$

$$H3=L2$$

where L0 to L2 show the brightness of the respective dots in original display data, and H0 to H3 show the brightness of the respective dots in enlarged display data.

Three pieces of original display data are enlarged to four pieces of enlarged display data according to the above equations. The above equations are repeated M/3 times (M is the total number of pieces of original data) to enlarge the entire original display data. In addition, the total amount Ht of the brightness of the display data enlarged according to the above equations is:

$$\begin{aligned} Ht &= H0+H1+H2+H3 \\ &= (1+1/3)L0+(2/3+2/3)L1+(1/3+1)L2 \\ &= 4/3(L0+L1+L2) \end{aligned}$$

This indicates that the total amount of the brightness of the original data has been increased 4/3 times.

As described above, this enlargement method attempts to enlarge images while still obtaining a good display quality by enlarging the area of the images according to a specified enlargement ratio and approximating the brightness distribution in enlarged data to that in original display data.

Referencing FIG. 24, the brightness L0 of the original data in the dot n1 is increased to (4/3) L0 by displaying the adjacent dot n2 so as to obtain a brightness of(1/3) L0. The brightness L1 of the dot n2 in the original data is increased to (4/3) L1 by displaying both the dots n2 and n3 so as to obtain a brightness of (2/3) L1. The brightness L2 of the dot n3 in the original data is increased to (4/3) L2 by displaying the dots n3 and n4 so as to obtain a brightness of (1/3) L2 and (1) L2, respectively. That is, each dot in the original data is used as a reference, and its adjacent dot is used to enlarge the original data so that its brightness will be increased 4/3 times. If the L0 to L2 all have the same value, for example, 1, H0 to H3 will all have a value of 1, which means that the brightness is increased 4/3 times after enlargement.

FIG. 25 shows the application of this display method to original data in six dots having a brightness distribution similar to that in FIG. 23. As is apparent from FIG. 25, the enlarged display data equals 4/3 times the original data, and the brightness of each enlarged dot is the medium value of the corresponding dot before enlargement.

It has been found, however, that the use of this raw-direction data enlargement method according to the prior art may generate the following problems.

FIG. 26 shows a graphic comprising original data before enlargement . The original image comprises six dots na to na+5 in the raw direction. The number 1 in each do t represents the brightness; all the dots thus have the same brightness. FIGS. 27 and 28 shows the same image enlarged 4/3 times the image in FIG. 26 in the raw direction using the conventional enlargement method. In the enlarged image in FIG. 27, enlargement has started at a dot with an odd number.

In the enlarged image in FIG. 28, enlargement has started at a dot with an even number. Comparison of these images shows that the geometry of an enlarged image depends on a dot at which the enlargement starts. In addition, the geometries of both enlarged images differ from that of the original image because dots with a gray scale of 1/3 or 2/3 are scattered irregularly in both enlarged images. Consequently, if a font (a character) is enlarged and displayed, the outline of the font may have a markedly degraded display quality.

There is thus a need to realize a display enlargement method capable of enlarging original data at an arbitrary enlargement ratio in such a way that enlarged data will have a brightness distribution similar to that in the original data, the method serving to improve the display quality of the outline of the image.

SUMMARY OF THE INVENTION

It is an object of this invention to provide a liquid crystal display method and apparatus capable of enlarging and displaying data at an arbitrary enlargement ratio and also displaying the outline of enlarged images smoothly.

It is another object of this invention to provide a liquid crystal display method and apparatus that beautifully shows, in particular, the outline of a character (a font) enlarged and displayed at an arbitrary enlargement ratio.

The above objects are achieved by a liquid crystal display method for displaying an enlarged image on a display panel of a color liquid crystal display apparatus in which display dots each comprising an array of three subpixels displaying red (R), green (G), and blue (B), respectively, are arranged in a matrix, comprising the steps of extending three pieces of raw-direction original display brightness data to be displayed in the three subpixels and applying a weight of a specified brightness to each piece to form enlarged display brightness data; and sequentially outputting the enlarged display brightness data to the subpixels to enlarge the original image in the raw direction of the display panel before display.

The above objects are also achieved by a liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in a matrix, comprising the steps of forming six pieces of enlarged display brightness data arranged in the order of R-G-B-R-G-B, G-B-R-G-B-R, or B-R-G-B-R-G and to which weights of brightness of [1/3, 2/3, 1, 1, 2/3, 1/3] are applied, respectively, based on three pieces of raw-direction original display brightness data to be displayed in the three subpixels constituting one of the display dots; and sequentially outputting the enlarged display brightness data to the six subpixels to enlarge the original image in the raw direction of the display panel before display.

The above objects are also achieved by a liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in a matrix, comprising the steps of forming first enlarged display brightness data comprising six pieces of enlarged display brightness data arranged in the order of R-G-B-R-G-B in the raw direction and to which weights of brightness of [1/3, 2/3, 1, 1, 2/3, 1/3] are applied, respectively, based on three pieces of raw-direction original display brightness data to be displayed in three subpixels constituting a first display dot; forming second enlarged display brightness data comprising six pieces of enlarged display brightness data arranged in the order of G-B-R-G-B-R in the raw direction and to which weights of brightness of [1/3, 2/3, 1, 1, 2/3, 1/3] are applied, respectively, based on three pieces of raw-direction original display brightness data to be displayed in three subpixels constituting a second display dot adjacent to the first display dot; forming third enlarged display brightness data comprising six pieces of enlarged display brightness data arranged in the order of B-R-G-B-R-G in the raw direction and to which weights of brightness of [1/3, 2/3, 1, 1, 2/3, 1/3] are applied, respectively, based on three pieces of raw-direction original display brightness data to be displayed in three subpixels constituting a third display dot adjacent to the second display dot; adding the first to third enlarged display brightness data to each other to combine them in data regions of the same color to which weights of brightness of 1/3 and 2/3 are applied, respectively, and sequentially outputting to the subpixels the enlarged display brightness data formed by combination to enlarge the original image 4/3 times in the raw direction of the display panel before display.

The above objects are also achieved by a liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in a matrix, comprising the steps of forming six pieces of first enlarged display brightness data [(1/3) RL0, (2/3) GL0, (1) BL0, (1) RL0, (2/3) GL0, (1/3) BL0] by weighting and enlarging in the raw direction, three pieces of raw-direction original display brightness data [RL0 (red), GL0 (green), BL0 (blue)] to be displayed in three subpixels constituting a first display dot; forming six pieces of second enlarged display brightness data [(1/3) GL1, (2/3) BL1, (1) RL1, (1) GL1, (2/3) BL1, (1/3) RL1] by weighting and enlarging in the raw direction, three pieces of raw-direction original display brightness data [RL1, GL1, BL1] to be displayed in three subpixels constituting a second display dot adjacent to the first display dot; forming six pieces of third enlarged display brightness data [(1/3) BL2, (2/3) RL2, (1) GL2, (1) BL2, (2/3) RL2, (1/3) GL2] by weighting and enlarging in the raw direction, three pieces of raw-direction original display brightness data [RL2, GL2, BL2] to be displayed in three subpixels constituting a third display dot adjacent to the second display dot; adding the fifth and sixth pieces of the first enlarged display brightness data [(2/3) GL0, (1/3) BL0] to the first and second pieces of the second enlarged display brightness data [(1/3) GL1, (2/3) BL1], respectively, to combine the first and second enlarged display brightness data; adding the fifth and sixth pieces of the second enlarged display brightness data [(2/3) BL1, (1/3) RL1 to the first and second pieces of the third enlarged display brightness data [(1/3) BL2, (2/3) RL2], respectively, to combine the second and third enlarged display brightness data; adding the fifth and sixth pieces of the third enlarged display brightness data [(2/3) RL2, (1/3) GL2] to the first and second pieces of a next enlarged display brightness data [(1/3) RLX, (2/3)

GLX], respectively, to combine the third and next enlarged display brightness data, and sequentially repeating this sequence of operations; and thereby sequentially outputting to the subpixels the enlarged display brightness data formed by combination to enlarge the original image 4/3 times in the raw direction of the display panel before display.

The above objects are also achieved by a liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in a matrix, comprising the steps of enlarging three pieces of raw-direction original display brightness data to be displayed in three subpixels constituting a first display dot, to six pieces of first enlarged display brightness data including single-color data at one end the brightness of which is reduced to half and two pieces of data of two other colors at the other end the brightness of which is reduced to half; enlarging three pieces of raw-direction original display brightness data to be displayed in three subpixels constituting a second display dot adjacent to the first display dot, to six pieces of second enlarged display brightness data including at one end, two pieces of data of the same two colors as in the other end of the first enlarged display brightness data the brightness of which is reduced to half and at the other end, one piece of data of the same color as in the one end of the first enlarged display brightness data the brightness of which is reduced to half; adding the two pieces of data at the other end of the first enlarged display brightness data to the two pieces of data at the one end of the second enlarged display brightness data, or the data at the one end of the first enlarged display brightness data to the data at the other end of the second enlarged display brightness data to combine the first and second enlarged display brightness data, and sequentially repeating this sequence of operations; and thereby sequentially outputting to the subpixels the enlarged display brightness data formed by combination to enlarge the original image 3/2 times in the raw direction of the display panel before display.

The above objects are also achieved by a liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in a matrix, comprising a first step of forming a first enlarged display brightness data comprising six pieces of enlarged display brightness data arranged in the order of R-G-B-R-G-B in the raw direction and to which weights of brightness of [1/3, 2/3, 1, 1, 2/3, 1/3] are applied, respectively, based on three pieces of raw-direction original display brightness data to be displayed in three subpixels constituting a first display dot; a second step of forming a second enlarged display brightness data comprising six pieces of enlarged display brightness data arranged in the order of G-B-R-G-B-R in the raw direction and to which weights of brightness of [1/3, 2/3, 1, 1, 2/3, 1/3] are applied, respectively, based on three pieces of raw-direction original display brightness data to be displayed in three subpixels constituting a second display dot adjacent to the first display dot; a third step of forming a third enlarged display brightness data comprising six pieces of enlarged display brightness data arranged in the order of B-R-G-B-R-G in the raw direction and to which weights of brightness of [1/3, 2/3, 1, 1, 2/3, 1/3] are applied, respectively, based on three pieces of raw-direction original display brightness data to be displayed in three subpixels constituting a third display dot adjacent to the second display dot; a fourth step of adding the first to third enlarged display brightness data to each other to combine them in data regions of the same color to which weights of brightness of 1/3 and 2/3 are applied, respectively, and sequentially outputting to the subpixels the enlarged display brightness data formed by sequentially repeating the first to fourth steps to enlarge the original image in the raw direction of the display panel before display, wherein M of the following steps are inserted before, after, or between the first to third steps: forming first supplementary enlarged display brightness data comprising five pieces of data arranged in the order of R-G-B-R-G and to which weights of brightness of [1/3, 2/3, 1, 2/3, 1/3] are applied, respectively, based on three pieces of raw-direction original display brightness data to be displayed in three subpixels constituting a display dot; forming second supplementary enlarged display brightness data comprising five pieces of data arranged in the order of G-B-R-G-B and to which weights of brightness of [1/3, 2/3, 1, 2/3, 1/3] are applied, based on three pieces of raw-direction original display brightness data to be displayed in three subpixels constituting a display dot; and forming third supplementary enlarged display brightness data comprising five pieces of data arranged in the order of B-R-G-B-R and to which weights of brightness of [1/3, 2/3, 1, 2/3, 1/3] are applied, respectively, based on three pieces of raw-direction original display brightness data to be displayed in three subpixels constituting a display dot; the M steps that can be added to each other and thus combined in data regions of the same color to which weights of brightness of 1/3 and 2/3 are applied, respectively, and wherein the enlarged display brightness data and the supplementary enlarged display brightness data that have been combined together are output sequentially to the subpixels to enlarge the original image (M+1)/M times (M ≧4) in the raw direction of the display panel before display.

The above objects are also achieved by a liquid crystal display method for displaying an enlarged image on a display panel of a liquid crystal display apparatus in which display dots are arranged in a matrix, comprising the steps of using a brightness weighting pattern given by:

Leading pattern: L−1: M/2N
L0: 1
L1: M/2N
Repetition pattern: Ln: 1−((2n −1)M/2N)
Ln+1: (2n+1)M/2N
(n is a natural number)

for original display brightness data on original display lines on the display panel to sequentially combine and add the repetition patterns to the lines starting with the display line L1 in the leading pattern to form enlarged display brightness data, which is then sequentially displayed on the display line L; and enlarging the original image (1+M/N) times in the column direction of the display panel before display.

The above objects are also achieved by the above liquid crystal display method wherein the weighting and addition of brightness are carried out after the original display brightness data is subjected to gamma (Γ) conversion so as to be converted from gradation data to brightness data.

The above objects are also achieved by the above liquid crystal display method wherein after the weighting and addition of brightness, the data is subjected to gamma reverse (Γ−1) conversion so as to be converted from brightness data to gradation data.

The above objects are also achieved by the above liquid crystal display method wherein the gamma reverse conversion is executed by selecting among a plurality of gamma reverse conversion tables corresponding to changes in the visual angle.

The above objects are also achieved by a liquid crystal display apparatus in which display dots each comprising three pixels displaying red (R), green (G), and blue (B), respectively, are arranged in a matrix, characterized in that the apparatus has a mathematic operation means for extending three pieces of raw-direction original display brightness data to be displayed in three subpixels and applying a specified weight to each piece to form enlarged display brightness data.

The above objects are also achieved by the above liquid crystal display apparatus characterized in that the apparatus includes before the mathematic operation means, a gamma (Γ) conversion means for subjecting the original display brightness data to gamma conversion to convert it from gradation data to brightness data.

The above objects are also achieved by the above liquid crystal display apparatus characterized in that the apparatus includes after the mathematic operation means, a gamma reverse (Γ−1) conversion means for converting brightness data to gradation data.

The above objects are also achieved by the above liquid crystal display apparatus characterized in that the gamma reverse conversion means includes a plurality of gamma reverse conversion tables corresponding to changes in the visual angle.

This invention enlarges images using color pixels R, G, and B as references before display, thereby enabling the outline of enlarged images to be displayed smoothly, and in particular, enabling the outline of enlarged characters (fonts) to be displayed beautifully.

BRIEF DESCRIPTION OF THE DRAWINGS

FIG. 15 describes the image enlargement method according to the fifth embodiment of this invention;

FIG. 16 describes the image enlargement method according to the fifth embodiment of this invention;

DESCRIPTION OF THE PREFERRED EMBODIMENTS

Embodiments of this invention are described below in the following order.

1. Enlargement in the raw direction
1-1. Enlargement at a ratio of 4/3 in the raw direction
1-2. Enlargement at a ratio of 3/2 in the raw direction
1-3. Enlargement at a ratio of (M+1)/M (M≧4) in the raw direction
1-4. Enlargement at a ratio of M/N (M≧N+2) in the raw direction
2. Enlargement in the column direction
3. Apparatus
3-1. Gamma correction
3-2. Visual correction
3-3. Configuration of the apparatus 1. Enlargement in the raw direction 1-1. Enlargement at a ratio of 4/3 in the raw direction As a first embodiment of this invention, a liquid crystal display method for enlarging original image data 4/3 times in the raw direction is described with reference to FIGS. 1 to 4.

A single pixel unit is a display dot on the display panel of a color liquid crystal display apparatus comprising a subpixel displaying red (R), a subpixel displaying green (G), and a subpixel displaying blue (B) arranged in this order. In the display panel of the color liquid crystal display apparatus, such display dots (pixels) are arranged in a matrix, for example, 640 dots in the raw (horizontal) direction and 480 dots in the column (vertical) direction.

Figure 1:
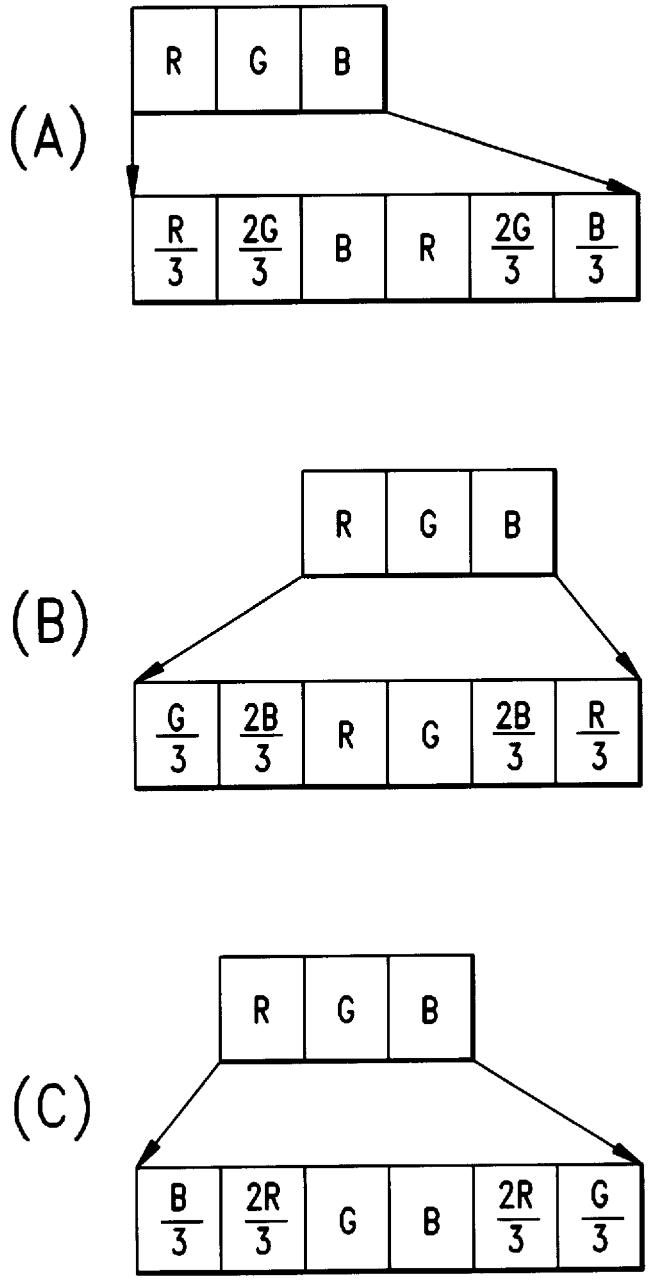
FIG. 1 shows an image enlargement pattern according to a first embodiment of this invention.
Figure 2:
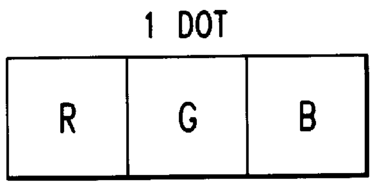
FIG. 2 shows the composition of one dot.

Referencing FIG. 1, a method for enlarging a single display dot 4/3 times is described. Assume three pieces of raw-direction original display brightness data [R, G, B] to be displayed in subpixels R, G, and B constituting a display dot.

This raw-direction original display brightness data is weighted and extended to a pattern (A) comprising six pieces of enlarged display brightness data, as shown in FIG. 1 (A).

[(1/3) R, (2/3) G, (1) B, (1) R, (2/3) G, (1/3) B] . . . Pattern (A)

The pattern (A) is obtained by enlarging to six subpixels the original data comprising three subpixels and applying weights of brightness of:

[1/3, 2/3, 1, 1, 2/3, 1/3] to the six pieces of enlarged data, respectively.

This weighting provides a brightness distribution in which the brightness gradually decreases from the center of an enlarged image to the periphery (the outline) thereof. This weighting also causes the total brightness of each original color Rt, Gt, and Bt to increase 4/3 times as follows:

Rt=(1/3) R+(1) R=(4/3) R

Gt=(2/3) G+(2/3) G=(4/3) G

Bt=(1) B+(1/3) B=(4/3) B

An enlarged image having a brightness distribution according to the above weighting and a total brightness of 4/3 times that of the original data can thus be obtained by driving the six subpixels in the enlarged display brightness data with the pattern (A) using the display dot in question in the raw direction and the subpixels in the display dot located to the right thereof.

Likewise, this raw-direction original display brightness data can be weighted and extended to a pattern (B) comprising six pieces of enlarged display brightness data, as shown in FIG. 1(B).

[(1/3) G, (2/3) B, (1) R, (1) G, (2/3) B, (1/3) R] . . . Pattern (B)

The pattern (B) is obtained by enlarging to six subpixels the original data comprising three subpixels and applying weights of brightness of:

[1/3, 2/3, 1, 1, 2/3, 1/3] to the six pieces of enlarged data, respectively. This weighting provides a brightness distribution in which the brightness of the periphery (the outline) of an enlarged image gradually decreases compared to that of the middle of the image.

This weighting also causes the total brightness of each original color to increase 4/3 times as follows:

Rt=(1) R+(1/3) R=(4/3) R

Gt=(1/3) G+(1) G=(4/3) G

Bt=(2/3) B+(2/3) B=(4/3) B

An enlarged image having a brightness distribution according to the above weighting and a total brightness of 4/3 times that of the original data can thus be obtained by driving the six subpixels in the enlarged display brightness data with the pattern (B) using the display dot in question in the raw direction, the subpixels G, B in the display dot located to the left thereof, and the subpixel R in the display dot located to the right thereof.

Furthermore, this raw-direction original display brightness data can be weighted and extended to a pattern (C) comprising six pieces of enlarged display brightness data, as shown in FIG. 1(C).

(1/3) B, (2/3) R, (1) G, (1) B, (2/3) R, (1/3) G] . . . Pattern (C)

The pattern (C) is obtained by enlarging to six subpixels the original data comprising three subpixels and applying weights of brightness of [1/3, 2/3, 1, 1, 2/3, 1/3] to the six pieces of enlarged data, respectively. This weighting provides a brightness distribution in which the brightness of the periphery (the outline) of an enlarged image gradually decreases compared to that of the middle of the image.

This weighting also causes the total brightness of each original color to increase 4/3 times as follows:

Rt=(2/3) R+(2/3) R=(4/3) R

Gt=(1) G+(1/3) G=(4/3) G

Bt=(1/3) B+(1) B=(4/3) B

An enlarged image having a brightness distribution according to the above weighting and a total brightness of 4/3 times that of the original data can thus be obtained by driving the six subpixels in the enlarged display brightness data with the pattern (C) using the display dot in question in the raw direction, the subpixel B in the display dot located to the left thereof, and the subpixels R, G in the display dot located to the right thereof.

As described above, the enlargement at a ratio of 4/3 per display dot can be achieved using one of the above three patterns, and the brightness distribution obtained by this method is smooth and unbiased.

Figure 3:
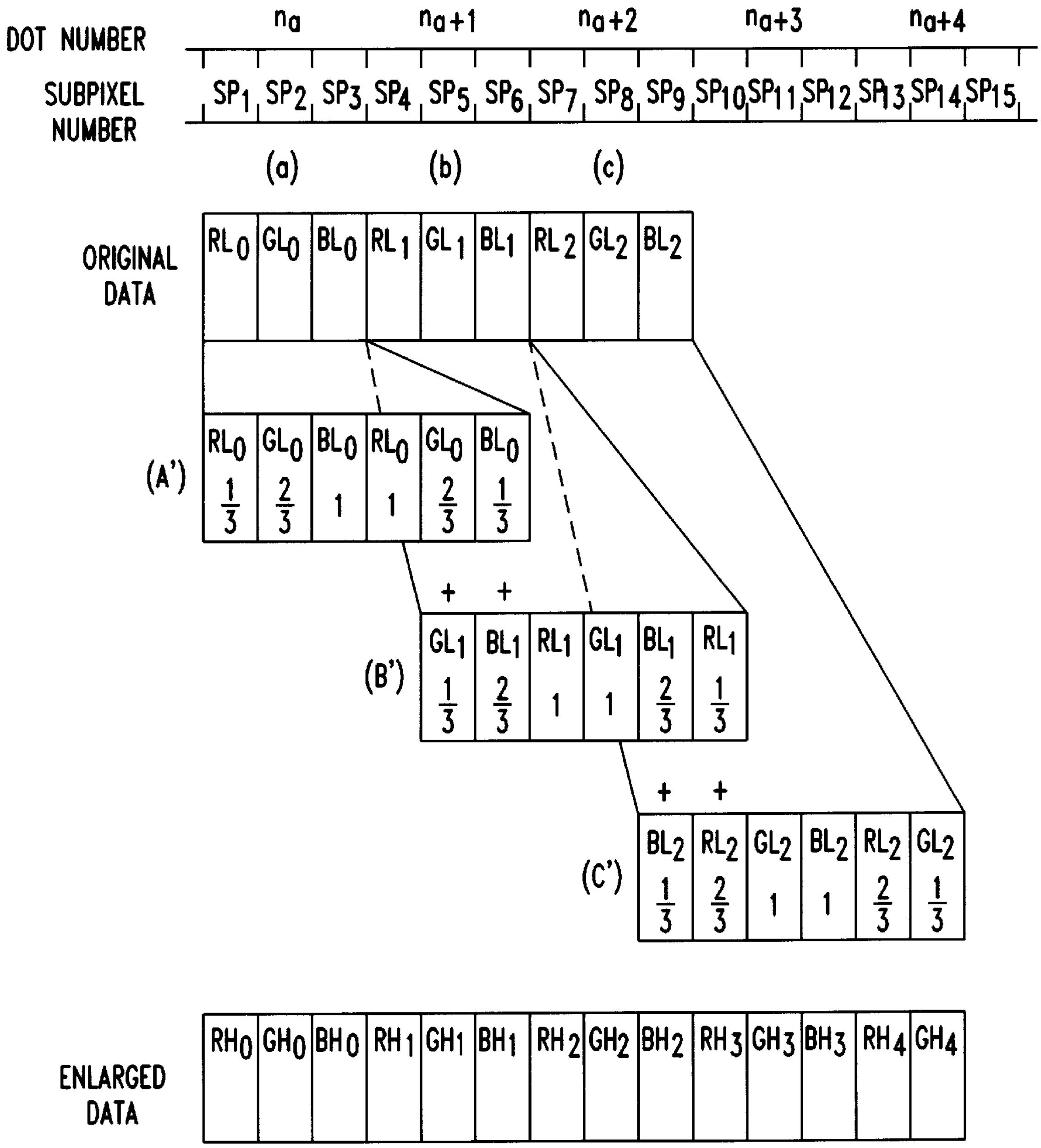
FIG. 3 describes an image enlargement method according to the first embodiment.

Next, a display method for combining the patterns (A), (B), and (C) to enlarge data in a single line on the liquid crystal display panel 4/3 times is described with reference to FIG. 3. In this embodiment, for simplification of explanation, it is assumed that original data (a), (b), and (c) for dots shown in FIG. 3 is displayed in the positions of dots na, na+1, and na+2 in the raw direction of the display panel if the data is displayed without enlargement and that the shifting of the display position of data due to enlargement does not occur to the left of the dot na.

First, the raw-direction original display brightness data [RL0, GL0, BL0] of the original display data (a) which is located in the corresponding subpixels is extended using the above pattern (A).

[(1/3) RL0, (2/3) GL0, (1) BL0, (1) RL0, (2/3) GL0, (1/3) BL0] . . . Pattern (A')

Likewise, the raw-direction original display brightness data [RL1, GL1, BL1] of the original display data (b) which is located in the corresponding subpixels is extended using the above pattern (B).

[(1/3) GL1, (2/3) BL1, (1) RL1, (1) GL1, (2/3) BL1, (1/3) RL1] . . . Pattern (B')

Furthermore, the raw-direction original display brightness data [RL2, GL2, BL2] of the original display data (c) which is located in the corresponding subpixels is extended using the above pattern (C).

[(1/3) BL2, (2/3) RL2, (1) GL2, (1) BL2, (2/3) RL2, (1/3) GL2] . . . Pattern (C')

The fifth and sixth subpixels (2/3) GL0 and (1/3) BL0 that are the enlarged display brightness data of the pattern (A') are then added to the first and second subpixels (1/3) GL1 and (2/3) BL1 that are the enlarged display brightness data of the pattern (B'), respectively, to combine these two pieces of enlarged display brightness data. The fifth and sixth subpixels (2/3) BL1 and (1/3) RL1 that are the enlarged display brightness data of the pattern (B') are also added to the first and second subpixels (1/3) BL2 and (2/3) RL2 that are the enlarged display brightness data of the pattern (C'), respectively, to combine these two pieces of enlarged display brightness data.

The enlarged display brightness data obtained comprises 14 subpixels compared to the original data comprising 9 subpixels. The general brightness distribution after enlargement is as follows:

RH0=(1/3) BL0

GH0=(2/3) GL0

BH0=(1) BL0

RH1=(1) BL0

GH1=(2/3) GL0+(1/3) GL1

BH1=(1/3) BL0+(2/3) BL1

RH2=(1) RL1

GH2=(1) GH1

BH2=(2/3) BL1+(1/3) BL2

RH3=(1/3) RL1+(2/3) RL2

GH3=(1) GL2

BH3=(1) BL2

RH4=(2/3) RL2

GH4=(1/3) GL2

RH0 to GH4 represent the brightness of each subpixel in an enlarged image. This indicates a brightness distribution in which the brightness of two subpixels at either end, which is the periphery of an enlarged image, gradually decreases compared to that of the middle of the image.

Furthermore, this weighting cause the total brightness of each original color Rt, Gt, and Bt to increase 4/3 times as follows:

$$\begin{aligned}
Rt &= RH0+RH1+RH2+RH3+RH4\\
&= (1/3)R10+(1)RL0+(1)RL1+(1/3)RL1+\\
&\quad (2/3)RL2+(2/3)RL2\\
&= (4/3)\,(RL0+RL1+RL2)\\
Gt &= GH0+GH1+GH2+GH3+GH4\\
&= (2/3)GL0+(2/3)GL0+(1/3)GL1+(1)GH1+\\
&\quad (1)GL2+(1/3)GL2\\
&= (4/3)\,(GL0+GL1+GL2)\\
Bt &= BH0+BH1+BH2+BH3\\
&= (1)BL0+(1/3)BL0+(2/3)BL1+(2/3)BL1+\\
&\quad (1/3)BL2+(1)BL2\\
&= (4/3)\,(BL0+BL1+BL2)
\end{aligned}$$

An enlarged image having a brightness distribution according to the above weighting and a total brightness of 4/3 times that of the original data can thus be obtained by driving the subpixels in above enlarged display brightness data.

The original data can be enlarged 4/3 times in the raw direction of the display panel by sequentially outputting the final data with the above pattern to the subpixels SP1 to SP14.

Figure 4:
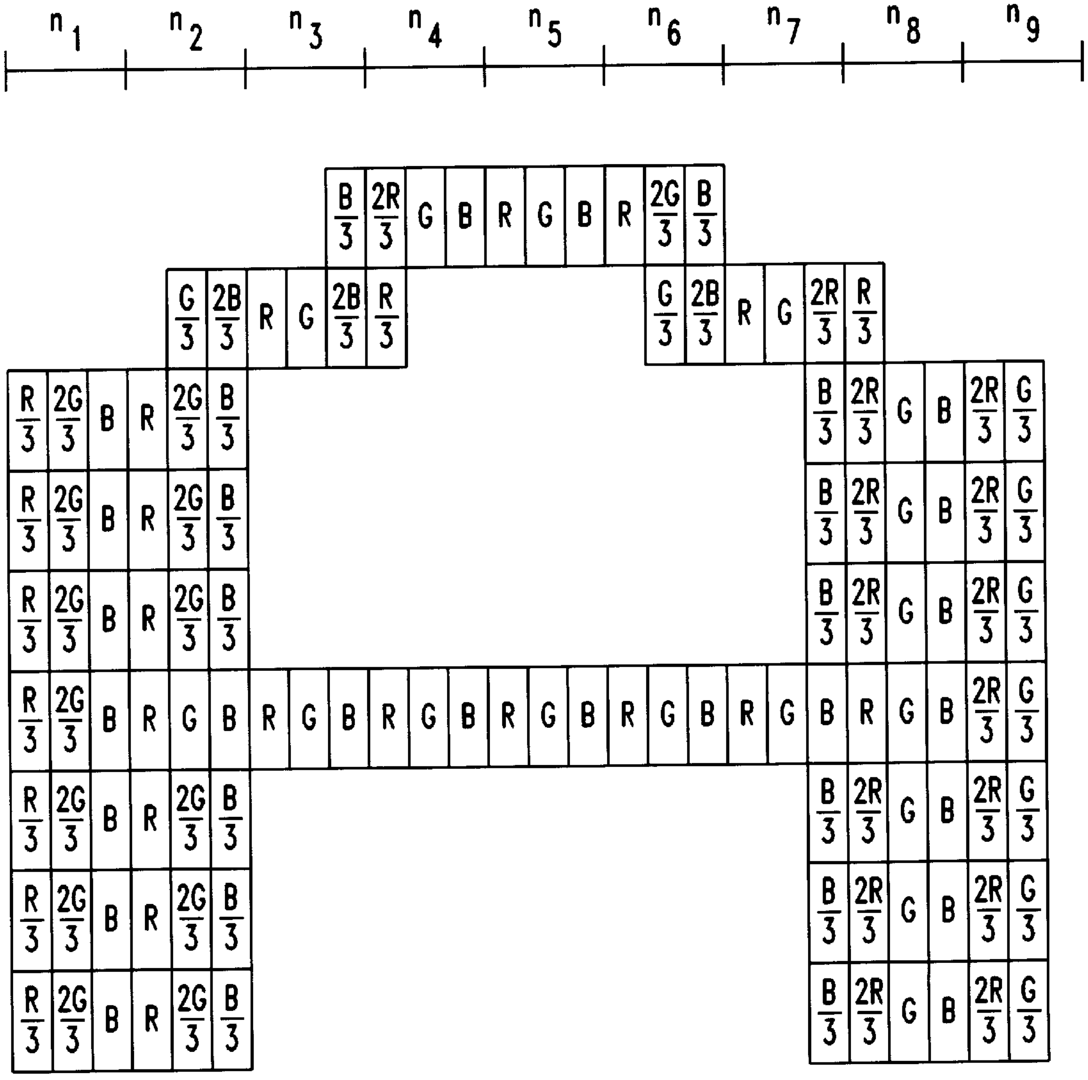
FIG. 4 shows an image obtained using the image enlargement method according to the first embodiment.
Figure 27:
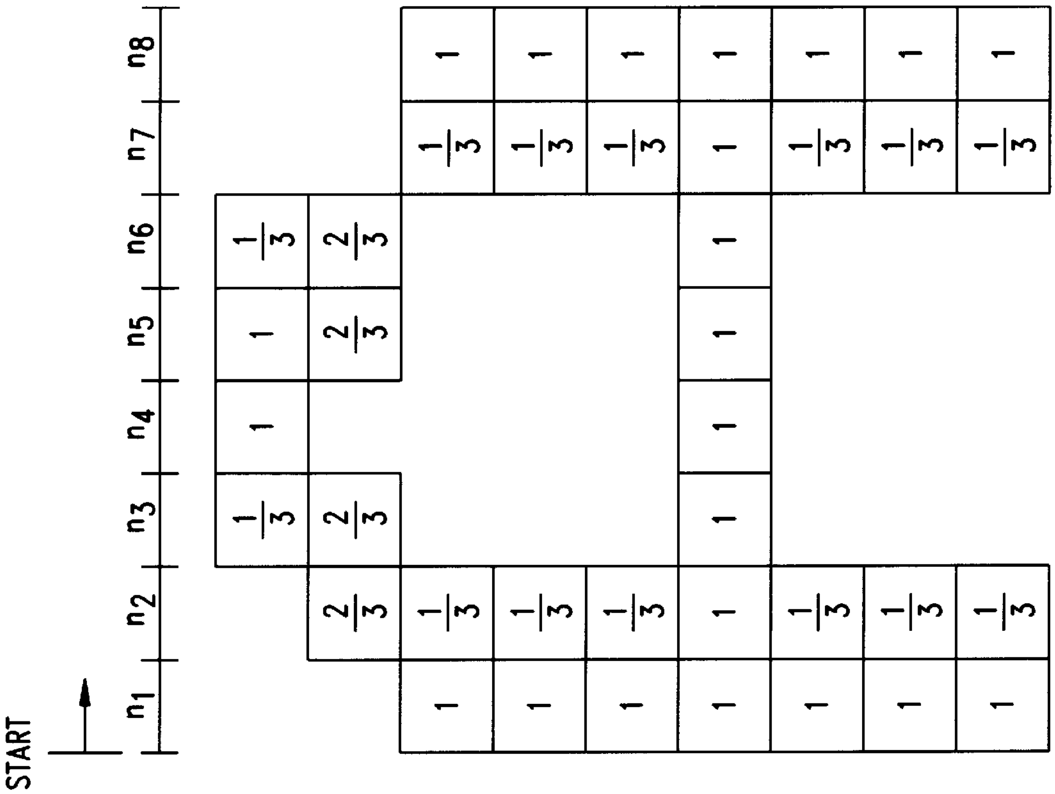
FIG.27 PRIOR ART
FIG. 27 shows an image enlarged according to the conventional image enlargement method.
Figure 26:
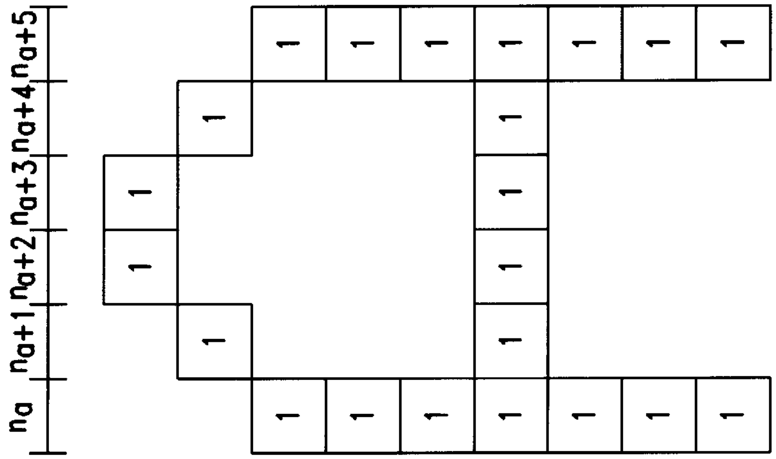
FIG.26 PRIOR ART
FIG. 26 shows an example of original display data.
Figure 28:
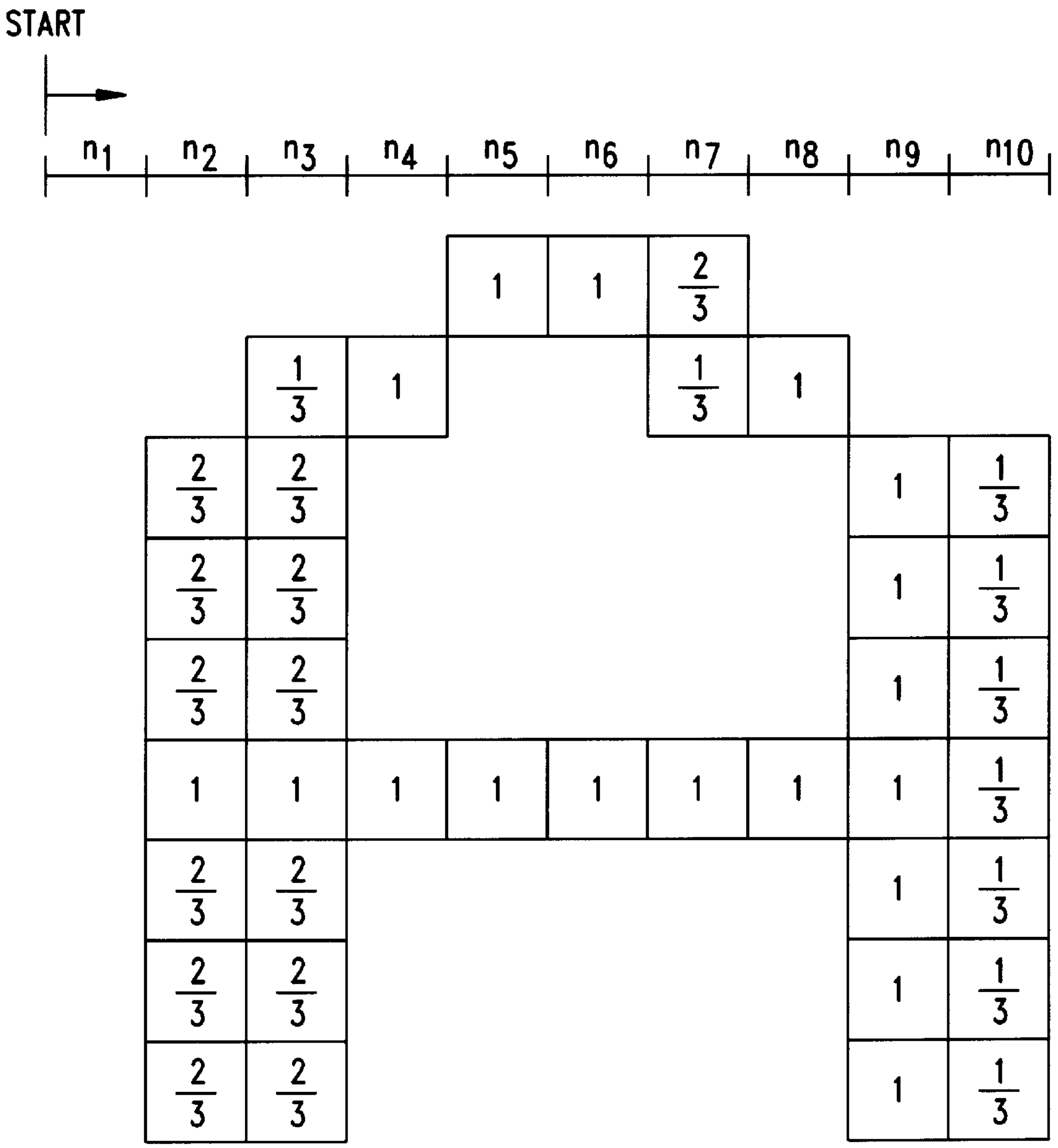
FIG.28 PRIOR ART
FIG. 28 shows an image enlarged according to the conventional image enlargement method.

FIG. 4 shows the result of enlargement of the graphic in FIG. 26 using the image enlargement method according to this embodiment. As is apparent from this figure, compared to the conventional enlargement method based on dots, the enlargement based on subpixels according to this embodiment causes an enlarged image to contain an additional uniform width on both sides of it in the raw direction (the total width is one dot), the width providing appropriate graduation. This gives the viewer the impression that a smooth outline is formed in the periphery of the graphic (character). Furthermore, this prevents the geometry of an enlarged image from varying depending upon the display position of the image as shown in FIG. 27 and 28, thereby providing an image enlarged at a specified ratio and which is true to original data.

1-2. Enlargement at a ratio of 3/2 in the raw direction

Figure 7:
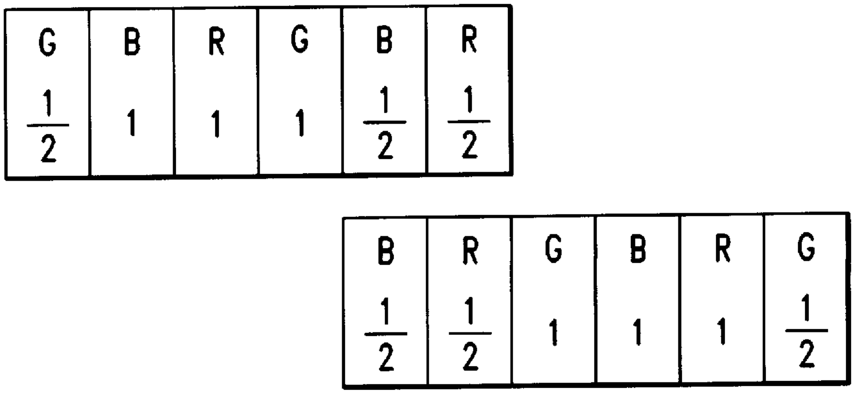
FIG. 7 shows another pattern according to the second embodiment.

As a second embodiment of this invention, a liquid crystal display method for enlarging original image data 3/2 times in the raw direction is described with reference to FIGS. 5 to 7.

Figure 5:
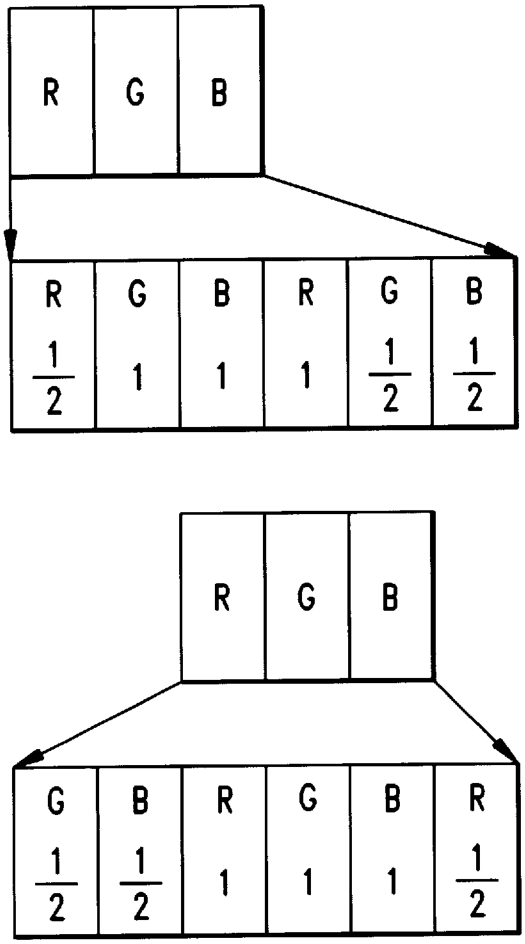
FIG. 5 shows an image enlargement pattern according to a second embodiment of this invention.
Figure 6:
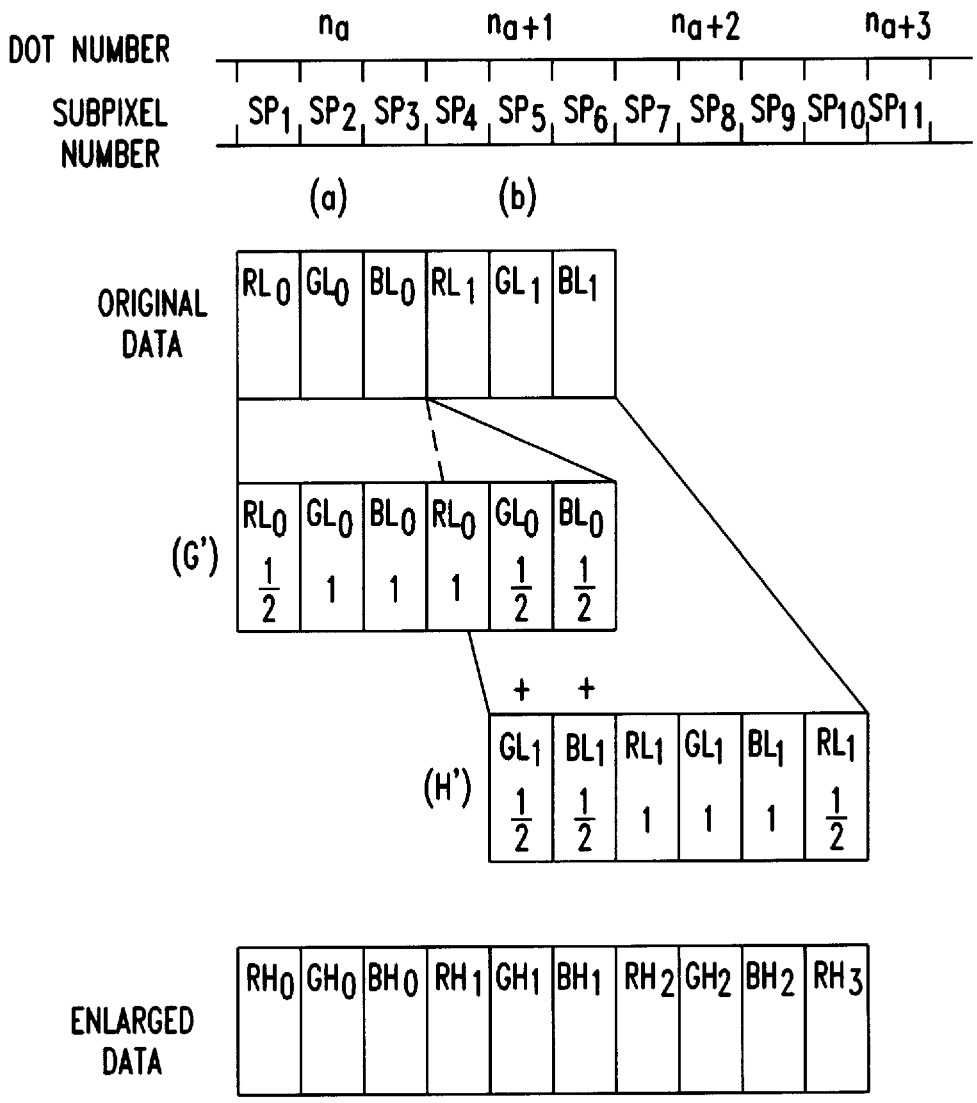
FIG. 6 describes an image enlargement method according to the second embodiment.

Referencing FIG. 5, a method for enlarging a single display dot 3/2 times is described. Assume three pieces of raw-direction original display brightness data [R, G, B] to be displayed in subpixels R, G, and B constituting a display dot. This raw-direction original display brightness data is weighted and extended to a pattern (G) comprising six pieces of enlarged display brightness data, as shown in FIG. 5(G).

[(½) R, (1) G, (1) B, (1) R, (½) G, (½) B] . . . Pattern (G)

The pattern (G) is obtained by enlarging to six subpixels the original data comprising three subpixels and applying weights of brightness of:

[½,1 , 1, 1, ½, ½] to the six pieces of enlarged data, respectively. This weighting provides a brightness distribution in which the brightness of the periphery (outline) of an enlarged image gradually decreases compared to that of the middle of the image.

This weighting also causes the total brightness of each original color Rt, Gt, and Bt to increase 3/2 times as follows:

Rt=(½) R+(1) R=(3/2) R

Gt=(1) G+(½) G=(3/2) G

Bt=(1) B+(½) B =(3/2) B

An enlarged image having a brightness distribution according to the above weighting and a total brightness of 3/2 times that of the original data can thus be obtained by driving the six subpixels in the enlarged display brightness data with the pattern (G) using the display dot in question in the raw direction and the subpixels in the display dot located to the right thereof.

Likewise, this raw-direction original display brightness data can be weighted and extended to a pattern (H) comprising six pieces of enlarged display brightness data, as shown in FIG. 5(H).

[(½) G, (½) B, (1) R, (1) G, (1) B, (½) R] . . . Pattern (H)

The pattern (H) is obtained by enlarging to six subpixels the original data comprising three subpixels and applying weights of brightness of:

[½, ½, 1, 1, 1, ½] to the six pieces of enlarged data, respectively. This weighting provides a brightness distribution in which the brightness of the periphery of an enlarged image gradually decreases compared to that of the middle of the image.

This weighting also causes the total brightness of each original color to increase 3/2 times as follows:

Rt=(1) R+(½) R=(3/2) R

Gt=(½) G+(1) G=(3/2) G

Bt=(½) B+(1) B=(3/2) B

An enlarged image having a brightness distribution according to the above weighting and a total brightness of 3/2 times that of original data can thus be obtained by driving the six subpixels in the enlarged display brightness data using the display dot in question in the raw direction, the subpixels G, B in the display dot located to the left thereof, and the subpixel R in the display dot located to the right thereof.

As described above, the enlargement at a ratio of 3/2 per display dot can be achieved using one of the above two patterns, and the brightness distribution in the raw direction obtained by this method is smooth and unbiased.

Next, a display method for combining the patterns (G) and (H) to enlarge data for a single line on the liquid crystal display panel 3/2 times is described with reference to FIG. 6. In this embodiment, for simplification of explanation, it is assumed that original data (a), and (b) for dots shown in FIG. 6 is displayed in the positions of dots na and na+1 in the raw direction of the display panel if the data is displayed without enlargement and that the shifting of the display position of data due to enlargement does not occur to the left of the dot na.

First, the raw-direction original display brightness data [BL0, GL0, BL0] of the original display data (a) which is located in the corresponding subpixels is extended using the above pattern (G).

[(½) RL0, (1) GL0, (1) BL0, (1) RL0, (½) GL0, (½) BL0] . . . Pattern (G')

Likewise, the raw-direction original display brightness data [RL1, GL1, BL1] of the original display data (b) which is located in the corresponding subpixels is extended using the above pattern (H).

[(½) GL1, (½) BL1, (1) RL1, (1) GL1, (1) BL1, (½) RL1] . . . Pattern (H')

The fifth and sixth subpixels (½) GL0 and (½) BL0 that are the enlarged display brightness data of the pattern (G') are then added to the first and second subpixels (½) GL1 and (½) BL1 that are the enlarged display brightness data of the pattern (H'), respectively, to combine these two pieces of enlarged display brightness data.

The enlarged display brightness data obtained comprises 10 subpixels compared to the original data comprising six subpixels. The general brightness distribution after enlargement is as follows:

RH0=(½) RL0

GH0=(1) GL0

BH0=(1) BL0

RH1=(1) BL0

GH1=(½) GL0+(½) GL1

BH1=(½) BL0+(½) BL1

RH2=(1) RL1

GH2=(1) GH1

BH2=(1) BL1

RH3=(½) RL1

RH0 to RH3 represent the brightness of each subpixel in an enlarged image. This thus indicates a brightness distribution in which the brightness of one subpixel at either end, which is the periphery of the enlarged image, is smaller than that of the middle of the image.

Furthermore, this weighting cause the total brightness of each original color Rt, Gt, and Bt to increase 3/2 times as follows:

$$\begin{aligned} Rt &= RH0 + RH1 + RH2 + RH3 \\ &= (1/2)RL0 + (1)RL0 + (1)RL1 + (1/2)RL1 \\ &= (3/2)\,(RL0 + RL1) \\ Gt &= GH0 + GH1 + GH2 \\ &= (1)GL0 + (1/2)GL0 + (1/2)GL1 + (1)GH1 \\ &= (3/2)\,(GL0 + GL1) \\ Bt &= BH0 + BH1 + BH2 \\ &= (1)BL0 + (1/2)BL0 + (1/2)BL1 + (1)BL1 \\ &= (3/2)\,(BL0 + BL1) \end{aligned}$$

An enlarged image having a brightness distribution according to the above weighting and a total brightness of 3/2 times that of the original data can thus be obtained by driving the subpixels in the above enlarged display brightness data. The original data can be enlarged 3/2 times in the raw direction of the display panel by sequentially outputting the final data with the above pattern to the subpixels SP1 to SP10.

Compared to the conventional enlargement method based on dots, the enlargement based on subpixels according to this embodiment causes an enlarged image to contain an additional width equal to one or two subpixels on both sides of it in the raw direction, thereby giving the viewer the impression that a smooth outline is formed in the periphery of the graphic (character).

Although the patterns (G), (H) shown in FIG. 5 have been used in this embodiment, other patterns can be used to produce similar effects if they comprise a combination of two types of patterns that can be combined together at their respective ends, each of the patterns including at one end one subpixel to which a weight of ½ is applied and at the other end two subpixels to which a weight of ½ is applied.

In addition, although in this embodiment, all the subpixels with a brightness of ½ located on either side of an enlarged image to act as a gradation area display red for convenience of explanation, each of these subpixels may display any of red, green, and blue. In fact, the display quality can be maximized by using as a gradation area one subpixel of G/2 or two subpixels of R/2 and B/2.

1-3. Enlargement at a ratio of (M+1)/M (M≧4) in the raw direction

As a third embodiment of this invention, a liquid crystal display method for cnlarging original image data (M+1)/M (M≧4) times in the raw direction is described with reference to FIGS. 8 to 11. The liquid crystal display method according to this embodiment is well characterized by the usc of the patterns (A), (B), and (C) used in the enlargement at a ratio of 4/3 described above. An image enlarged (M+1)/M (M≧4) times is then obtained by inserting supplementary patterns shown below, before, after, or between these patterns, as appropriate.

Figure 8:
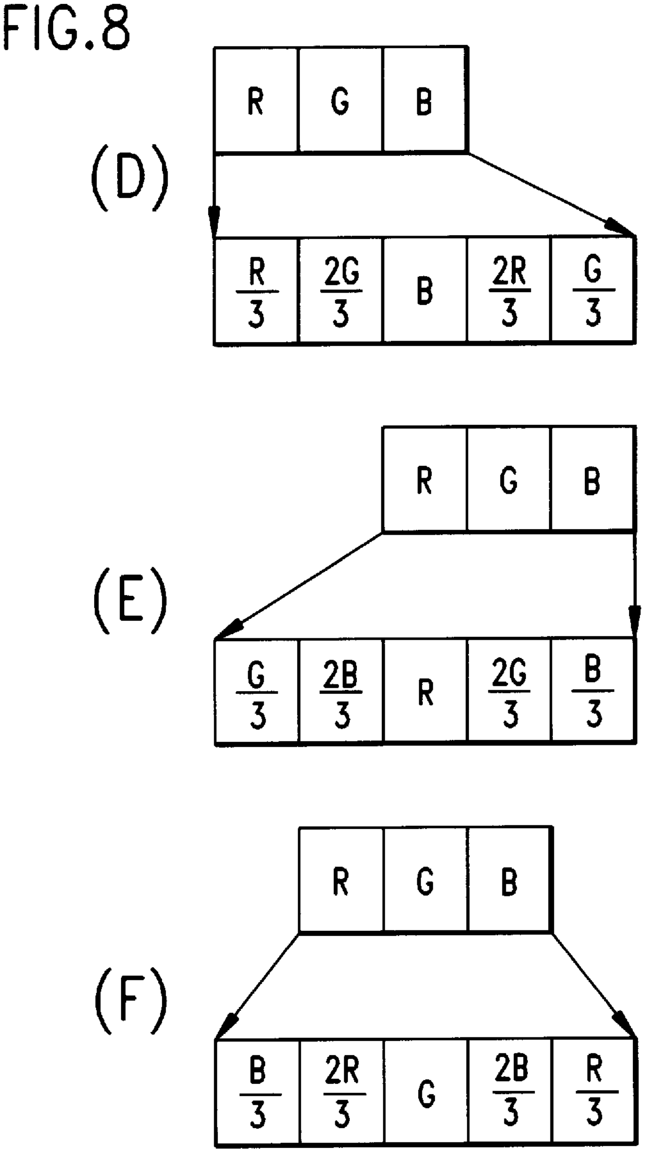
FIG. 8 shows an image enlargement pattern according to a third embodiment of this invention.

The supplementary patterns are described with reference to FIG. 8. Assume three pieces of raw-direction original display brightness data [R, G, B] to be displayed in subpixles R, G, B constituting a display dot.

The raw-direction original display brightness data is weighted and extended to a pattern (D) comprising five pieces of enlargement display brightness data, as shown in FIG. 8(D).

[(1/3) R, (2/3) G, (1) B, (2/3) R, (1/3) G] . . . Pattern (D)

The pattern (D) is obtained by enlarging to five subpixels the original data comprising three subpixels and applying weights of brightness of:

[1/3, 2/3, 1, 2/3, 1/3] to the five pieces of enlarged data, respectively. This weighting provides a brightness distribution in which the brightness of the periphery (the outline) of an enlarged image gradually decreases compared to that of the middle of the image.

This weighting also causes the total brightness of each original color Rt, Gt, and Bt to maintain the same value as follows:

Rt=(1/3) R+(2/3) R=(1) R

Gt=(2/3) G+(1/3) G=(1) G

Bt=(1) B

No enlargement has thus occurred.

An image having a brightness distribution according to the above weighting and a total brightness equal to that of the original data can thus be obtained by driving the five subpixels in the enlargement display brightness data. The original data cannot be enlarged by using only this enlargement display brightness data.

Likewise, this raw-direction original display brightness data can be weighted and extended to a pattern (E) comprising five pieces of enlargement display brightness data, as shown in FIG. 8(E).

[(1/3) G, (2/3) B, (1) R, (2/3) G, (1/3) B] . . . Pattern (E)

The pattern (E) has been subjected to the same weighting as the pattern (D), and all the colors have the same brightness as before the weighting. That is, the brightness has not been increased.

Furthermore, this raw-direction original display brightness data can be weighted and extended to a pattern (F) comprising five pieces of enlargement display brightness data, as shown in FIG. 8(F).

[(1/3) B, (2/3) R, (1) G, (2/3) B, (1/3) R] . . . Pattern (F)

The pattern (F) has been subjected to the same weighting as the pattern (D), and all the colors have the same brightness as before the weighting. That is, the brightness has not been increased.

These patterns (D), (E), and (F) are similar to the patterns (A), (B), and (C) in that the brightness of the periphery of the pattern is gradually decreasing and differ from the patterns (A), (B), and (C) in that they have one less piece of data and that their enlargement ratio is 1 instead of 4/3.

These patterns (D), (E), and (F) are used as supplementary patterns. A liquid crystal display method for enlarging an original image data (M+1)/M times by combining the patterns (A), (B), and (C) with the above supplementary patterns and first enlarging an original image data 5/4 times is described below with reference to FIG. 9.

Figure 9:
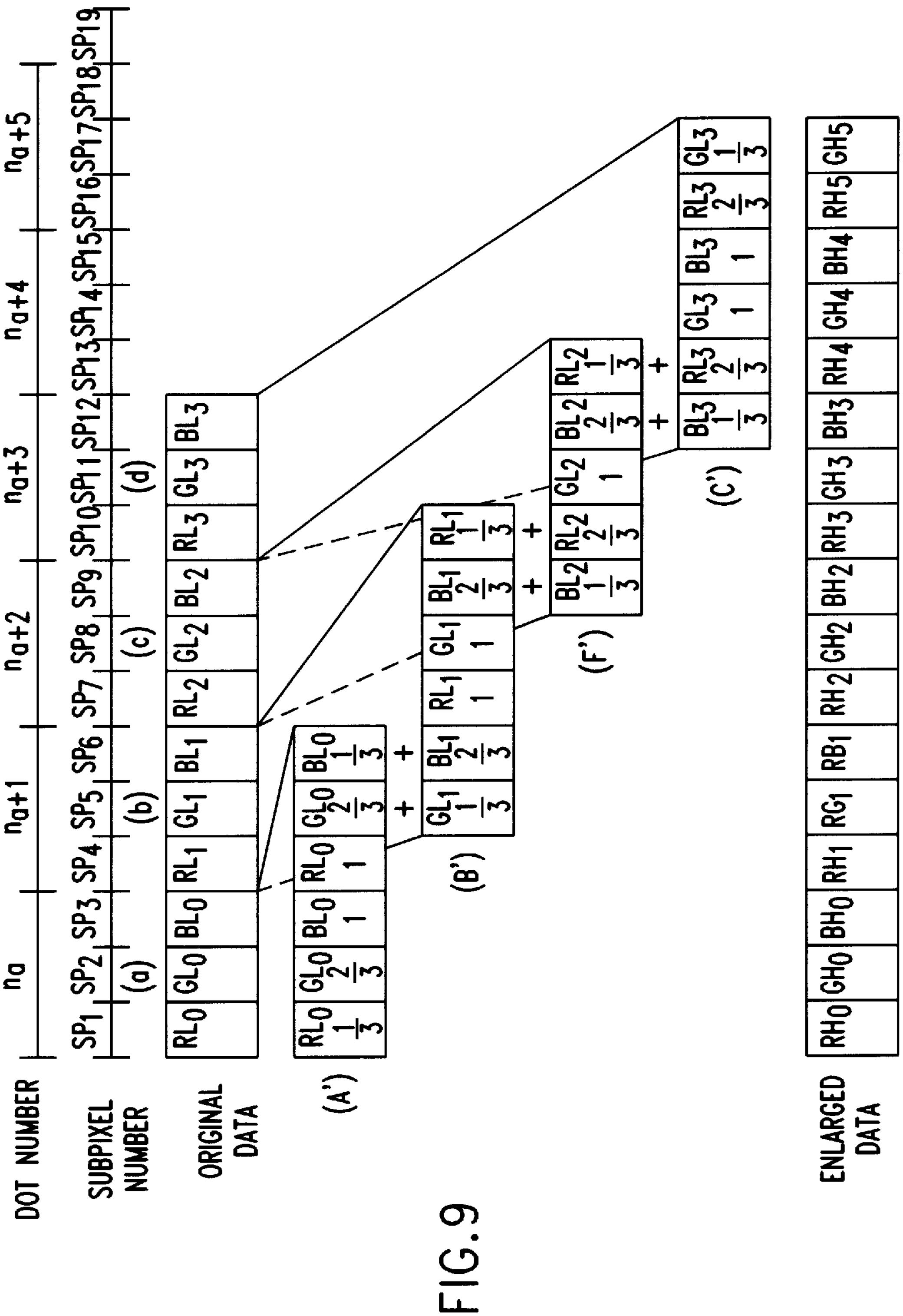
FIG. 9 describes an image enlargement method according to the third embodiment.

In this embodiment, for simplification of explanation, it is assumed that original dot data (a), (b), (c), and (d) in FIG. 9 is displayed in the positions of dots na, na+1, na+2, and na+3 in the raw direction of the display panel if the data is displayed without enlargement and that the shifting of the display position of data due to enlargement does not occur to the left of the dot na.

First, the raw-direction original display brightness data [RL0, GL0, BL0] of the original display data (a) which is located in the corresponding subpixels is extended using the above pattern (A).

[(1/3) RL0, (2/3) GL0, (1) BL0, (1) BL0, (2/3)GL0, (1/3) BL0] . . . Pattern (A')

Likewise, the raw-direction original display brightness data [RL1, GL1, BL1] of the original display data (b) which is located in the corresponding subpixels is extended using the above pattern (B).

[(1/3) GL1, (2/3) BL1, (1) RL1, (1) GL1, (2/3) BL1, (1/3) RL1] . . . Pattern (B')

The raw-direction original display brightness data [RL2, GL2, BL2] of the original display data (c) which is located in the corresponding subpixels is then extended using the above supplementary pattern (F).

[(1/3) BL2, (2/3) RL2, (1) GL2, (2/3) BL2, (1/3)RL2] . . . Pattern (F')

The raw-direction original display brightness data [RL3, GL3, BL3] of the original display data (d) which is located in the corresponding subpixels is extended using the above pattern (C).

[(1/3) BL3, (2/3) RL3, (1) GL3, (1)BL3, (2/3) RL3, (1/3) GL3] . . . Pattern (C')

The fifth and sixth subpixels (2/3) GL0 and (1/3) BL0 that are the enlarged display brightness data of the pattern (A') are then added to the first and second subpixels (1/3) GL1 and (2/3) BL1 that are the enlarged display brightness data of the pattern (B'), respectively, to combine these two pieces of enlarged display brightness data.

The fifth and sixth subpixels (2/3) BL1 and (1/3) RL1 that are the enlarged display brightness data of the pattern (B') are then added to the first and second subpixels (1/3) BL2 and (2/3) RL2 that are the enlarged display brightness data of the pattern (F'), respectively, to combine these two pieces of enlarged display brightness data.

The fourth and fifth subpixels (2/3) BL2 and (1/3) RL2 that are the enlarged display brightness data of the pattern (F') are then added to the first and second subpixels (1/3) BL3 and (2/3) RL3 that are the enlarged display brightness data of the pattern (C'), respectively, to combine these two pieces of enlarged display brightness data.

The enlarged display brightness data obtained comprises 17 subpixels compared to the original data comprising 12 subpixels. The general brightness distribution after enlargement is as follows:

RH0=(1/3) BL0
GH0=(2/3) GL0
BH0=(1) BL0
RH1=(1) BL0
GH1=(2/3) GL0+(1/3) GL1
BH1=(1/3) BL0+(2/3) BL1
RH2=(1) RL1
GH2=(1) GH1
BH2=(2/3) BL1+(1/3) BL2
RH3=(1/3) RL1+(2/3) RL2
GH3=(1) GL2
BH3=(2/3) BL2+(1/3) BL3
RH4=(1/3) RL2+(2/3) RL3
GH4=(1) GL3
BH4=(1) BL3
RH5=(2/3) RL3
GH5=(1/3) GL3

RH0 to GH5 represent the brightness of each subpixel in an enlarged image. This thus indicates a brightness distribution in which the brightness of two subpixels at either end, which is the periphery (the outline) of the enlarged image, gradually decreases compared to that of the middle of the image.

Furthermore, this weighting causes the total brightness of each original color Rt, Gt, and Bt to increase as follows:

$$
\begin{aligned}
Rt &= RH0 + RH1 + RH2 + RH3 + RH4 + RH5 \\
&= (1/3)RL0 + (1)RL0 + (1)RL1 + (1/3)RL1 + \\
&\quad (2/3)RL2 + (1/3)RL2 + (2/3)RL3 + (2/3)RL3 \\
&= (4/3)\ (RL0 + RL1 + RL3) + (1/1)\ (RL2) \\
Gt &= GH0 + GH1 + GH2 + GH3 + GH4 + GH5 \\
&= (2/3)GL0 + (2/3)GL0 + (1/3)GL1 + (1)GL1 + \\
&\quad (1)GL2 + (1)GL3 + (1/3)GL3 \\
&= (4/3)\ (GL0 + GL1 + GL3) + (1/1)\ (GL2) \\
Bt &= BH0 + BH1 + BH2 + BH3 + BH4 \\
&= (1)BL0 + (1/3)BL0 + (2/3)BL1 + (2/3)BL1 + \\
&\quad (1/3)BL2 + (2/3)BL2 + (1/3)BL3 + (1)BL3 \\
&= (4/3)\ (BL0 + BL1 + BL3) + (1/1)\ (BL2)
\end{aligned}
$$

The above equation indicates that the original data comprising four dots is enlarged to five dots by enlarging each of the subpixels corresponding to the three dots of the original data to subpixels corresponding to four dots, increasing the brightness of each of the original colors 4/3 times, d adding one dot of the same brightness to the resultant subpixels. An enlarged image having a brightness distribution according to the above weighting and a total brightness of about 5/4 times that of the original data can thus be obtained by driving the subpixels in the above enlarged display brightness data.

The original data can be enlarged 5/4 times in the raw direction of the display panel by sequentially outputting the final data with the above pattern to the subpixels SP1 to SP17.

Although in the above embodiment, the enlargement at a ratio of 5/4 has been carried out by inserting the supplementary pattern (F) between the pattern (B) and the pattern (C), other supplementary patterns may be used to implement enlargement at the same ratio. In such a case, if the supplementary pattern (E) is used, the pattern in question may be inserted between the pattern (A) and the pattern (B), whereas if the supplementary pattern (D) is used, it may be connected to the leading end of the pattern (A) or the trailing end of the pattern (C).

The same operation as in the above embodiment that describes the enlargement at a ratio of 5/4 may be performed to easily display an image enlarged (M+1)/M (M≧5) times. That is, the desired enlargement at a ratio of (M +1)/M can be carried out by inserting before, after, or between the patterns (A), (B), and (C) to be enlarged 4/3 times, M−3 supplementary patterns comprising one or more of the respective supplementary patterns (D), (E), and (F). For example, enlargement at a ratio of 6/5 can be implemented by inserting selected two of the three patterns (D), (E), and (F) into the position shown in FIG. 10 or 11, and an image can be enlarged 7/6 times or 8/7 times by inserting selected three or four supplementary patterns, respectively, between the patterns (A), (B), and (C).

1-4. Enlargement at a ratio of M/N (M ≧N+2) in the raw direction

Figure 12:
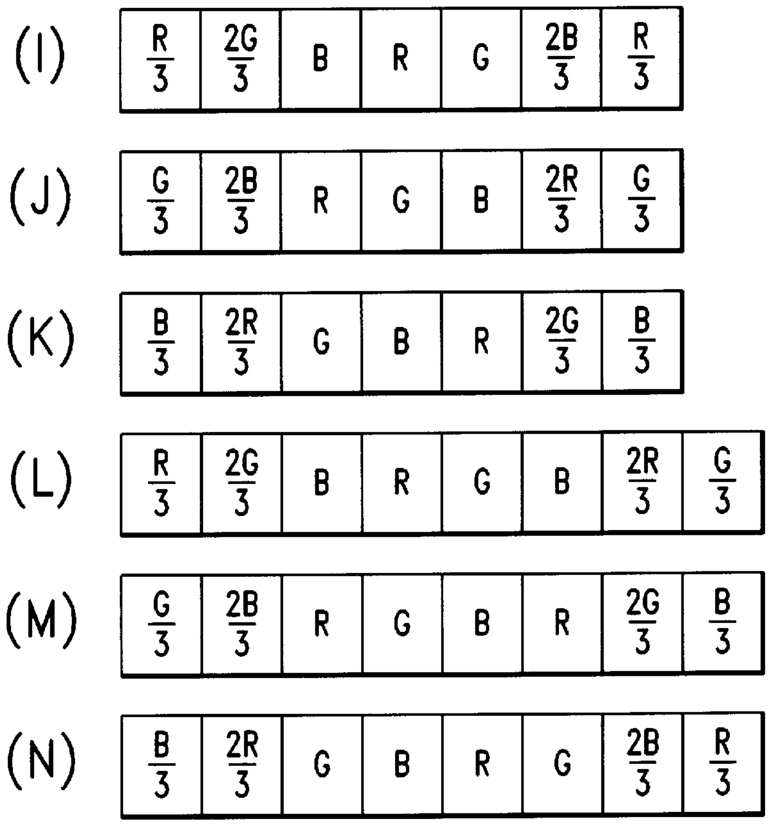
FIG. 12 shows an image enlargement pattern according to a fourth embodiment of this invention.
Figure 14:
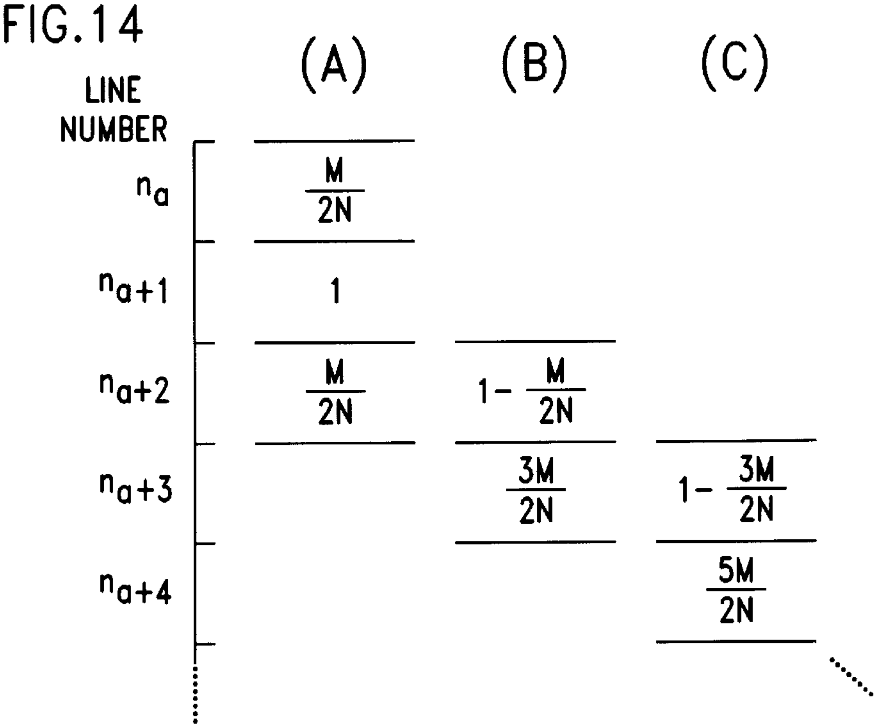
FIG. 14 describes an image enlargement method according to a fifth embodiment of this invention.
Figure 13:
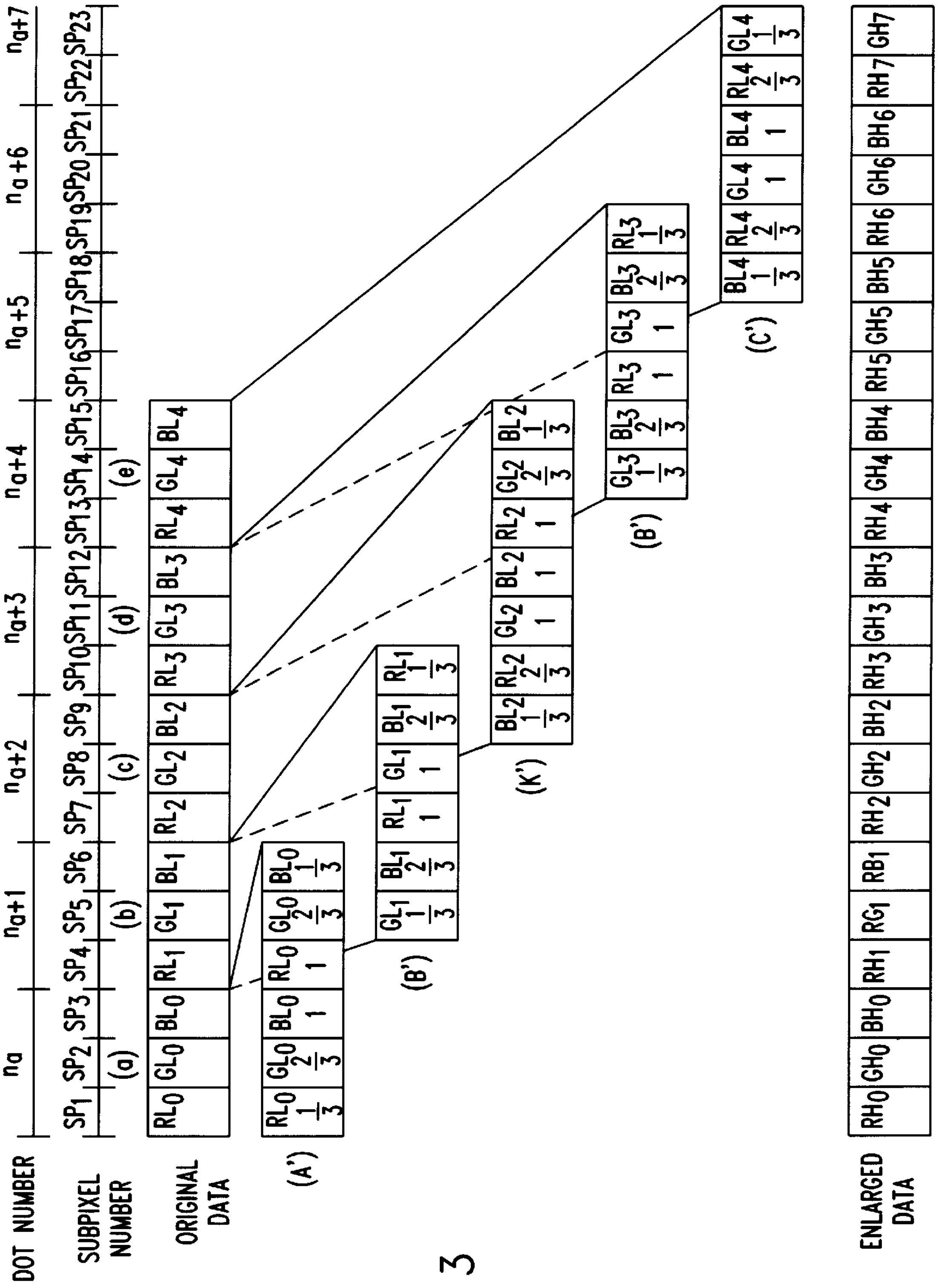
FIG. 13 describes the image enlargement method according to the fourth embodiment.

As a fourth embodiment of this invention, a liquid crystal display method for enlarging original image data M/N (M≧N+2) times in the raw direction is described with reference to FIGS. 12 and 13. The liquid crystal display method according to this embodiment is well characterized by the basic use of the patterns (A), (B), and (C) used for the enlargement at a ratio of 4/3 described above. An image enlarged M/N (M≧N+2) times is then obtained by inserting supplementary patterns shown below, before, after, or between these patterns, as appropriate.

The supplementary patterns are described with reference to FIG. 12. Three pieces of raw-direction original display brightness data [R, G, B] to be displayed in subpixels R, G, B constituting a display dot are weighted and extended to a pattern (I) comprising seven pieces of enlargement display brightness data, as shown in FIG. 12(I).

[(1/3) R, (2/3) G, (1) B, (1) R, (1) G, (2/3) B, (1/3) R] . . . Pattern (I)

The pattern (I) is obtained by enlarging to seven subpixels the original data comprising three subpixels and applying weights of brightness of:

[1/3, 2/3, 1, 1, 1, 2/3, 1/3] to the seven pieces of enlarged data, respectively. This weighting causes the total brightness of each original color Rt, Gt, and Bt to increase 5/3 times as follows:

Rt=(1/3) R+(1) R+(1/3) R=(5/3) R

Gt=(2/3) G+(1) G=(5/3) G

Bt=(1) B+(2/3) B=(5/3) B

Likewise, this raw-direction original display brightness data can be weighted and extended to a pattern (J) comprising seven pieces of enlargement display brightness data, as shown in FIG. 12(J).

[(1/3) G, (2/3) B, (1) R, (1) G, (1) B, (2/3) R, (1/3) G] . . . Pattern (J)

The pattern (J) has been subjected to the same weighting as the pattern (I).

Furthermore, the data can be extended to the pattern (K) shown in FIG. 12(K).

[(1/3) B, (2/3) R, (1) G, (1) B, (1) R, (2/3)G, (1/3) B] . . . Pattern (K)

These patterns (I), (J), and (K) are similar to the patterns (A), (B), and (C) in that the brightness of the periphery of the pattern is gradually decreasing and differ from the patterns (A), (B), and (C) in that they have one more piece of data and that their enlargement ratio is 5/3 instead of 4/3.

These patterns (I), (J), and (K) are used as supplementary patterns. As an example of enlargement at a ratio of M/N, by combining the patterns (A), (B), and (C) with the above supplementary patterns, a liquid crystal display method for enlarging original image data 7/5 times in the raw direction is described with reference to FIG. 13.

First, the original display data (a) and (b) are extended as in the third embodiment.

[(1/3) RL0, (2/3) GL0, (1) BL0, (1) RL0, (2/3) GL0, (1/3) BL0] . . . Pattern (A')

[(1/3) GL1, (2/3) BL1, (1) RL1, (1) GL1, (2/3) BL1, (1/3) RL1] . . . Pattern (B')

The raw-direction original display brightness data [RL2, GL2, BL2] of the original display data (c) which is located in the corresponding subpixels is then extended using the above supplementary pattern (K).

[(1/3) BL2, (2/3) RL2, (1) GL2, (1) BL2, (1) RL2, (2/3) GL2, (1/3) BL2] . . . Pattern (K')

The raw-direction original display brightness data [RL3, GL3, BL3] of the original display data (d) which is located in the corresponding subpixels is extended using the abovc pattern (B).

[(1/3) GL3, (2/3) BL3, (1) RL3, (1) GL3, (2/3) BL3, (1/3) RL3] . . . Pattern (B')

The raw-direction original display brightness data [RL4, GL4, BL4] of the original display data (e) which is located in the corresponding subpixels is extended using the above pattern (C).

[(1/3) BL4, (2/3) RL4, (1) GL4, (1) BL4, (2/3) RL4, (1/3) GL4] . . . Pattern (C')

The patterns obtained are then combined together as in the above embodiment to enlarge the original data comprising 15 subpixels to 23 subpixels. The gencral brightness distribution after enlargement is as follows:

RH0=(1/3) BL0

GH0=(2/3) GL0

BH0=(1) BL0

RH1=(1) PL0

GH1=(2/3) GL0+(1/3) GL1

BH1=(1/3) BL0+(2/3) BL1

RH2=(1) RL1

GH2=(1) GH1

BH2=(2/3) BL1+(1/3) BL2

RH3=(1/3) RL1+(2/3) RL2

GH3=(1) GL2

BH3=(1) BL2

RH4=(1) RL2

GH4=(2/3) GL2+(1/3) GL3

BH4=(1/3) BL2+(2/3) BL3

RH5=(1) RL3

GH5=(1) GL3

BH5=(2/3) BL3+(1/3) BL4

RH6=(1/3) RL3+(2/3) RL4

GH6=(1) GL1

BH6=(1) BL4

RH7=(2/3) RL4

GH7=(1/3) GL4

RH0 to GH7 represent the brightness of each subpixel in an enlarged image. This thus indicates a brightness distribution in which the brightness of two subpixels at either end, which is the periphery (the outline) of the enlarged image, gradually decreases compared to that of the middle of the image.

Furthermore, this weighting cause the total brightness of each original color Rt, Gt, and Bt to increase as follows:

$$
\begin{aligned}
Rt &= RH0 + RH1 + RH2 + RH3 + RH4 + RH5 + RH6 + RH7 \\
&= (1/3)RL0 + (1)RL0 + (1)RL1 + (1/3)RL1 + \\
&\quad (2/3)RL2 + (1)RL2 + (1)RL3 + (1/3)RL3 + (2/3)RL4 + (2/3)RL4 \\
&= (4/3)\,(RL0 + RL1 + RL2 + RL3 + RL4) + (1/3)\,(RL2) \\
Gt &= GH0 + GH1 + GH2 + GH3 + GH4 + GH5 + GH6 + GH7 \\
&= (2/3)GL0 + (2/3)GL0 + (1/3)GL1 + (1)GL1 + \\
&\quad (1)GL2 + (2/3)GL2 + (1/3)GL3 + (1)GL3 + (1)GL4 + (1/3)GL4 \\
&= (4/3)\,(GL0 + GL1 + GL2 + GL3 + GL4) + (1/3)\,(GL2) \\
Bt &= BH0 + BH1 + BH2 + BH3 + BH4 + BH5 + BH6 \\
&= (1)BL0 + (1/3)BL0 + (2/3)BL1 + (2/3)BL1 + \\
&\quad (1/3)BL2 + (2/3)BL2 + (1/3)BL2 + (2/3)BL3 + (2/3)BL3 + \\
&\quad (1/3)BL4 + (1)BL4 \\
&= (4/3)\,(BL0 + BL1 + BL2 + BL3 + BL4) + (1/3)\,(BL2)
\end{aligned}
$$

If the brightness of each piece of data is 1, the brightness becomes 7 after enlargement compared to 5 before enlargement. The brightness has thus been increased 7/5 times. That is, the subpixels corresponding to 5 original data dots are enlarged to the subpixels corresponding to seven dots with the brightness of each original color increased 7/5 times. Consequently, an enlarged image having a brightness distribution according to the above weighting and a total brightness of 7/5 times that of the original data can thus be obtained by driving the subpixels in the above enlarged display brightness data.

The original data can be enlarged 7/5 times in the raw direction of the display panel by sequentially outputting the final data with the above pattern to the subpixels SP1 to SP23.

Figure 10:
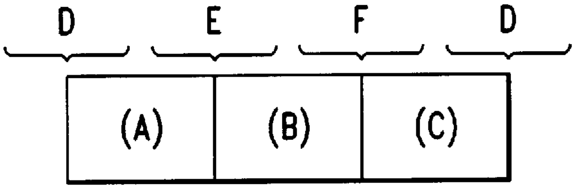
FIG. 10 describes the image enlargement method according to the third embodiment.
Figure 11:
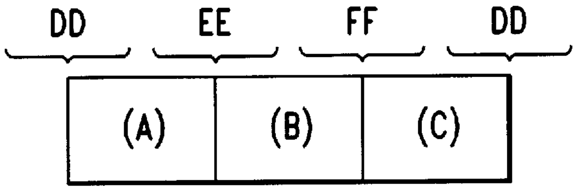
FIG. 11 describes the image enlargement method according to the third embodiment.

Although the supplementary pattern (K) has been used in the above embodiment, the supplementary pattern (I) or (J) may be used to implement a similar enlargement as shown in FIGS. 10 and 11 in the third embodiment. Enlargement at a ratio of 8/5 may be implemented easily by combining three patterns enlarged at a ratio of 4/3 with two patterns enlarged at a ratio of 5/3. Enlargement at a ratio of up to 6/3 may be implemented by combining a pattern enlarged at a ratio of 5/3 with the supplementary pattern (L), (M), or (N) enlarged at a ratio of 6/3 which are shown in FIG. 12. General enlargement at a ratio of M/N ($M \geqq N+2$) may easily be implemented by combining a pattern enlarged at a ratio of X/3 ($(X-1)/3 > M/N > X/3$) with a pattern enlarged at a ratio of $(X-1)/3$.

2. Enlargement at a ratio of (1+M/N) in the column (vertical) direction

As a fifth embodiment of this invention, a method for enlarging an image (1+M/N) times in the column direction is described. A pattern with a weighting given by:

Leading pattern: L−1: M/2N
  L0: 1
  L1: M/2N
Repetition pattern: Ln: 1−((2n−1) M/2N)
  Ln+1: (2n +1) M/2N (n is a natural number sequentially increasing from 1) is formed for a display line L on the display panel. The repetition patterns are sequentially combined together starting with the display line L1 in the leading pattern to form brightness data. This data is then sequentially displayed on the display line L, thereby enabling the original image to be enlarged (1+M/N) times in the column direction of the display panel.

Specifically, in the enlargement in the vertical direction, the brightness is distributed in the patterns as follows for each line of the display panel:

Pattern (A)—Center line: 1
  Upper and lower lines: M/2N
Pattern (B)—Upper line: 1−(M/2N)
  Lower line: 3M/2N
Pattern (C)—Upper line: 1−(3M/2N)
  Lower line: 5M/2N

.
.
.

To vertically enlarge an image (1+M/N) times, the patterns can be sequentially combined together according to the line numbers in the order of na . . . , starting with the uppermost pattern (A).

The total brightness for each pattern is 1+(M/N), and the total brightness of each line after combination is 1.

An example in which original data corresponding to three lines (all the pieces of data have a brightness of 1) is vertically enlarged 4/3 times is described with reference to FIG. 15. Since M=1 and N=3, the original data for the three lines na, na+1, and na+2 is enlarged by combining the following patterns together:

Pattern (A')—Center line: 1
  Upper and lower lines: 1/6
Pattern (B')—Upper line: 5/6
  Lower line: 3/6
Pattern (C')—Upper line: 3/6
  Lower line: 5/6

This causes the lines na to na+2 to be enlarged into these lines plus lines na+3 and na+4 and the brightness to increase to 4. The original data is thus enlarged 4/3 times.

The vertical enlargement method according to this invention and conventional vertical enlargement methods (similar to the conventional horizontal enlargement method) are described with reference to FIG. 16. FIG. 16 shows an enlargement in the case in which the brightness of the original data alternates between 0 and 1 for the corresponding lines. Conventional enlargement methods result in faded boundaries with each line having a brightness of 1/3 instead of 0, whereas the present enlargement method ensures the generation of lines with a brightness of 1/6, thereby enabling every other line to be recognized better in the enlarged display.

3. Apparatus 3-1. Gamma correction

Figures 17, 18:
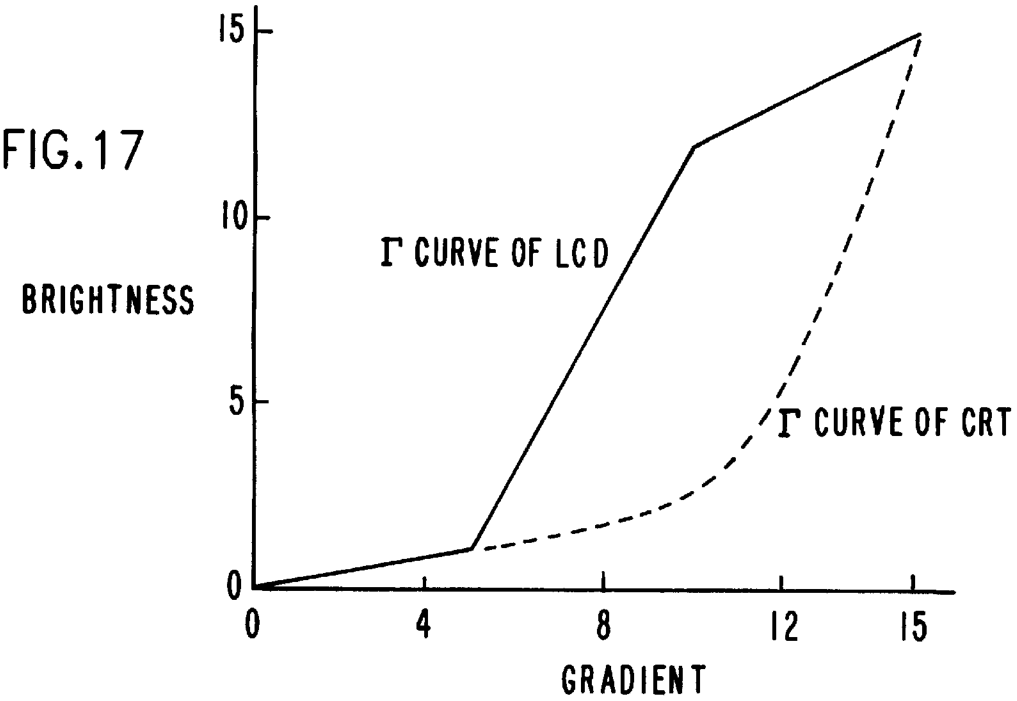
FIG. 17 describes gamma correction used in the first to fifth embodiments.
FIG. 18 describes the gamma conversion.

To adapt to an actual liquid crystal display apparatus the liquid crystal display method for enlarging images which has been shown using the first to fifth embodiments, weighted and enlarged display brightness data must be subjected to gamma (Γ) correction. This is because the display brightness data shown in the above embodiments is input from the system to an actual liquid crystal display apparatus as gradient data ranging from 0 to 15 levels. FIG. 17 describes an example of gamma correction used in the first to fifth embodiments. In this figure, the horizontal axis shows gradient, while the vertical axis shows brightness. FIG. 17 shows that the gamma curve of a liquid crystal display apparatus (the solid line) differs from that of a CRT (the broken line) and that the brightness increases nonlinearly with increasing gradient ranging from 0 to 15.

Thus, in the enlargement in the above embodiments, the weighted brightness such as 1/3, 2/3, or 1/3+2/3 must be determined by subjecting the weighting shown in each embodiment to gamma correction to convert the data from the gradient to the actual brightness, performing required mathematic operations, and subjecting the results of the operations to gamma reverse (Γ−1) conversion to convert them to gradient data. FIG. 18 shows an example of a gamma and gamma reverse conversion table. The liquid crystal display apparatus may include such a gamma and gamma reverse conversion table to mathematically operate on the enlarged display brightness data in each embodiment.

3-2. Visual correction

Figures 19, 20:
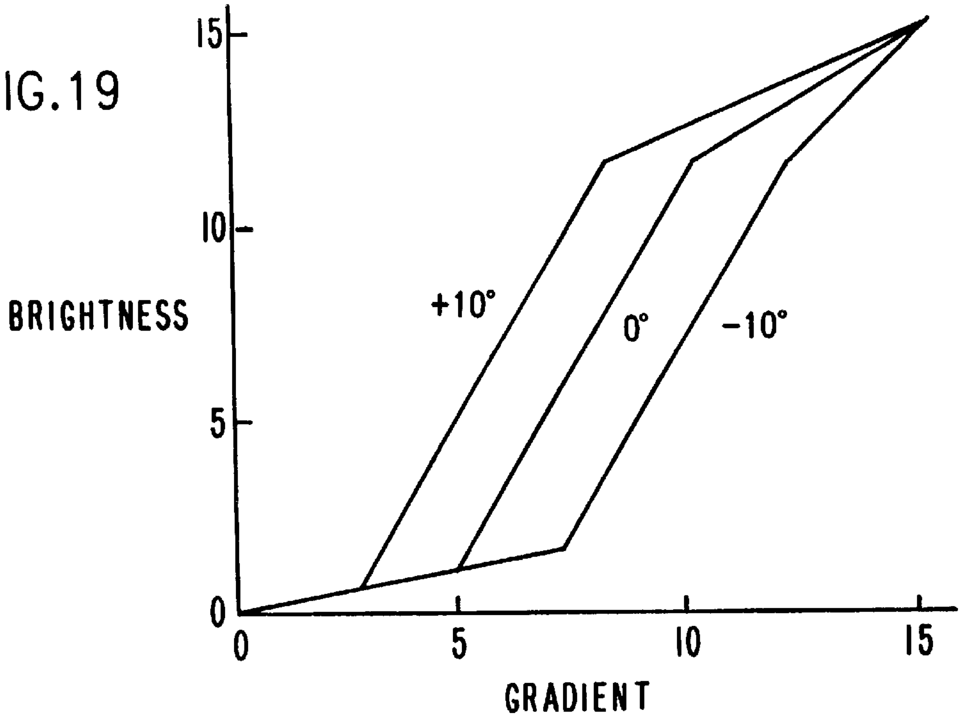
FIG. 19 describes visual angle correction used in the first to fifth embodiments.
FIG. 20 shows gamma correction for the visual angle.

In the gamma correction, even visual angle characteristics must be taken into consideration. FIG. 19 shows the dependence on the visual angle of the relationship between the gamma curve and the brightness. As shown in this figure, the gamma curve varies according to the angle between the viewer and the normal of the liquid crystal display panel on which images are displayed. FIG. 19 shows the case in which the eyes of the viewer move perpendicularly to the screen. If correction is not executed in the liquid crystal display apparatus based on the visual angle characteristics, the gradient varies according to the visual angle. For example, if the brightness is 5, that is, one third of 15, the gradient is 7 when viewed from the front at an angle of 0°, 5 when viewed from 10° above, and 9 when viewed from 10° below. Thus, for gamma reverse conversion of gamma-converted gradation data, a gamma reverse conversion table as shown in FIG. 20 for which the visual angle characteristics are taken into consideration may be provided so as to select an appropriate item in response to a particular change in the visual angle, which is then used in displaying images on the display panel.

3-3. Configuration of the apparatus

A liquid crystal display apparatus for implementing the image enlargement method according to the first to fifth embodiments is described with reference to FIG. 21.

Figure 21:
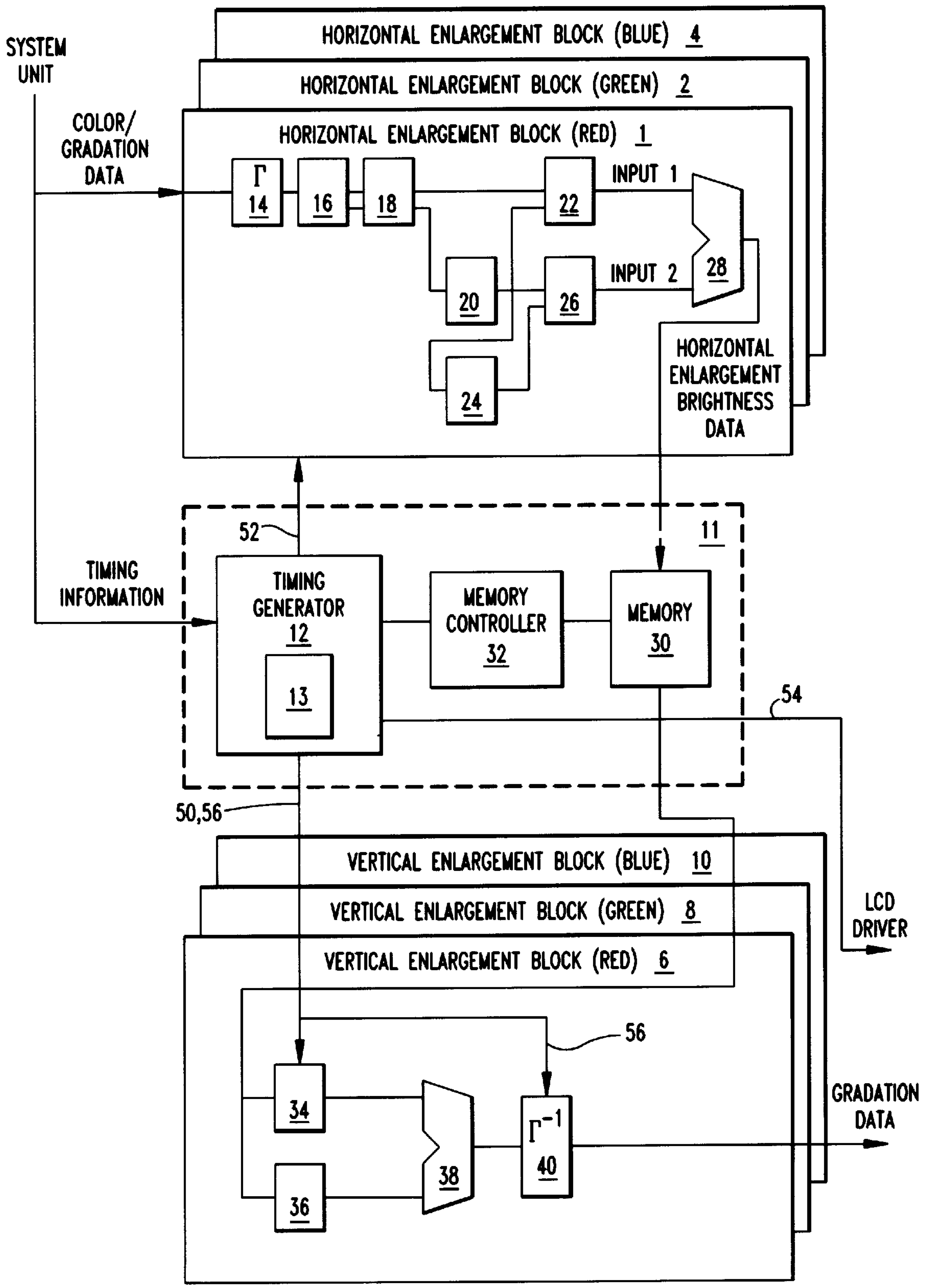
FIG. 21 shows a liquid crystal display apparatus for implementing the image enlargement method according to the first to fifth embodiments.

FIG. 21 shows the configuration of an image enlargement device in a liquid crystal display apparatus according to this embodiment. The image enlargement device can be roughly divided into horizontal enlargement blocks 1, 2, and 4, vertical enlargement blocks 6, 8, and 10, and a timing/memory block 11. Since both the horizontal enlargement blocks 1, 2, and 4 and the vertical enlargement blocks 6, 8, and 10 each have the same configuration and perform the same operation except that they are provided so as to correspond to R, G, and B, respectively, only the horizontal enlargement block 1 and the vertical enlargement block 6 are described for simplification of explanation.

Timing information such as horizontal synchronizing signals (H-Sync) and vertical synchronizing signals (V-Sync) and color/gradation information for R, G, and B in analog or digital signals which are sent from a personal computer system unit are input to a timing generator 12 and the gamma conversion section 14 of the horizontal enlargement block 1, respectively.

H-Sync and V-Sync signals input to the timing generator 12 are used by an enlargement mode dcterminator 13 to determine an enlargement ratio for images, or an input means (not shown) such as a switch is used to cause the enlargement mode determinator 13 to perform the same operation. Once the enlargement ratio has been determined, the timing generator 12 outputs timing information 50 and 52 for each mathematic operation to the horizontal and vertical enlargement blocks 1, 6 and a memory controller 32 according to the timing for the system, and also outputs vertical visual angle correction information 56 and data write timing information 54 to the vertical enlargement block 6 and the driver of the liquid crystal display device (LCD), respectively.

The horizontal enlargement block 1 is described. Red color/gradation information sent from the system is converted to brightness data using a gamma conversion table 14, which is then sent to a mathematic operation table 16. The mathematic operation table 16 performs on brightness data, mathematic operations for applying weights of 1, 1/2, or 1/3 according to the enlargement ratio. The brightness data on which the weighting operation has been performed is input to a data timing latch 18 and then to latches 20, 24 and a shifter 22 for superposition and addition of enlarged display brightness data. The output of the shifter 22 is input to the latch 24 and the input 1 of an adder 28. The output of the latches 20 and 24 are input to a shifter 26. The output of the shifter 26 is input to the input 2 of the adder 28. The latches 20, 24, shifters 22, 26, and adder 28 executes horizontal enlargement. Brightness data output from the adder 28 is stored in a memory 30. The memory 30 is a line or frame buffer.

Next, the vertical enlargement block 6 is described. Data for each display line is sent from the memory 30 to mathematic operation tables 34 and 36 according to the timing for writing data to the liquid crystal display apparatus. Predetermined mathematic operations for enlargement at a ratio of (1+M/N) are then performed, and an adder 38 executes additions for overlapping regions. The output of the adder 38 is converted by a gamma reverse conversion table 40 from brightness data to gradation data, which is then sent to an LCD driver. The gamma reverse conversion table 40 also carries out visual angle corrections.

Figure 22:
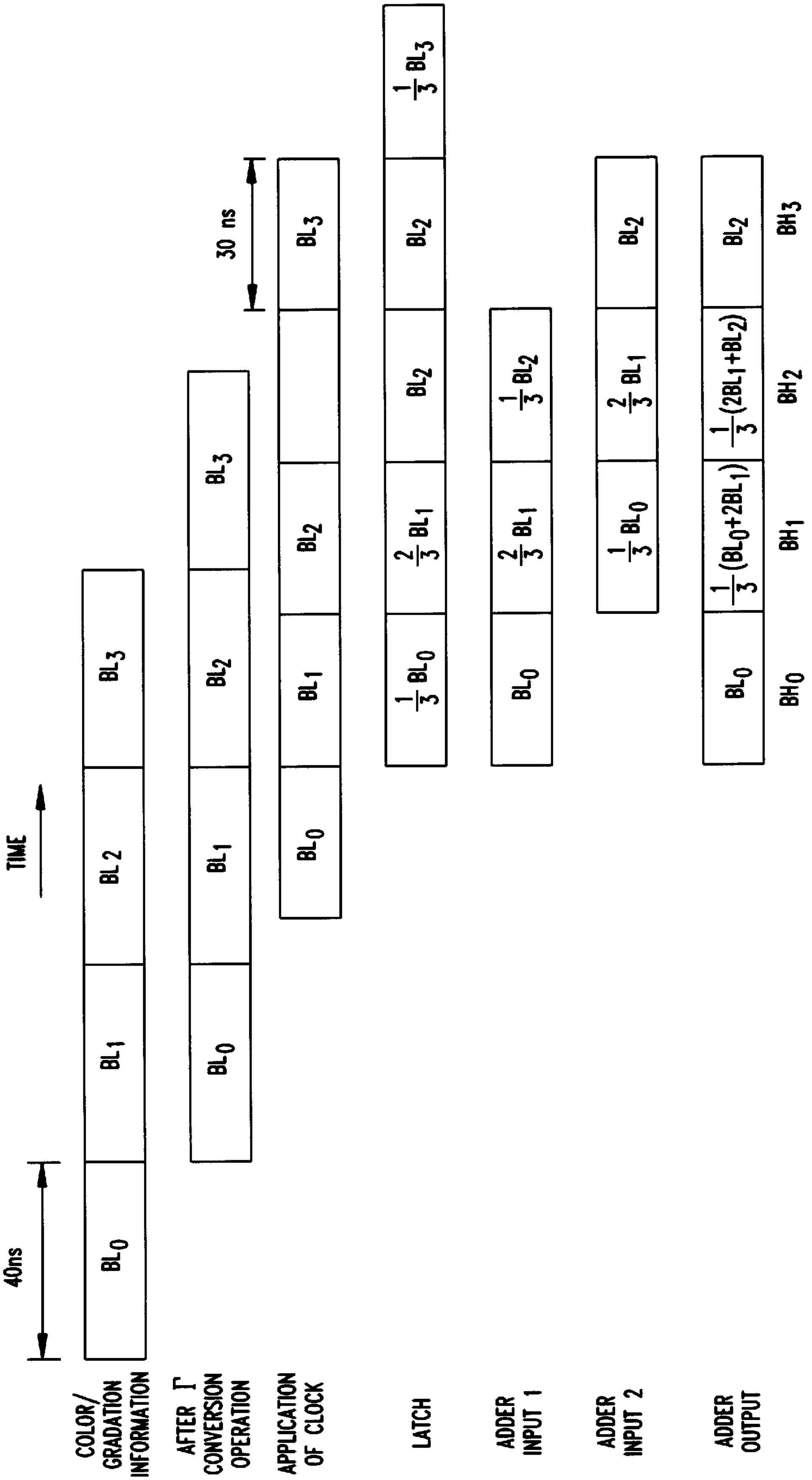
FIG. 22 shows a timing for horizontal enlargement.
Figure 23:
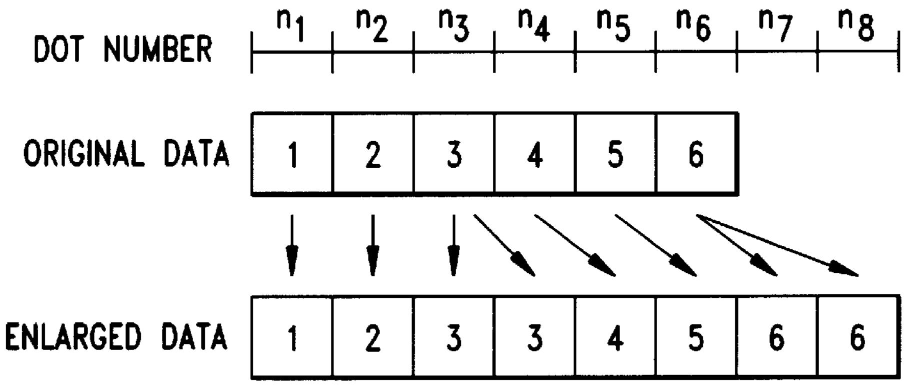
FIG.23 PRIOR ART
FIG. 23 shows a conventional image enlargement method.
Figure 24:
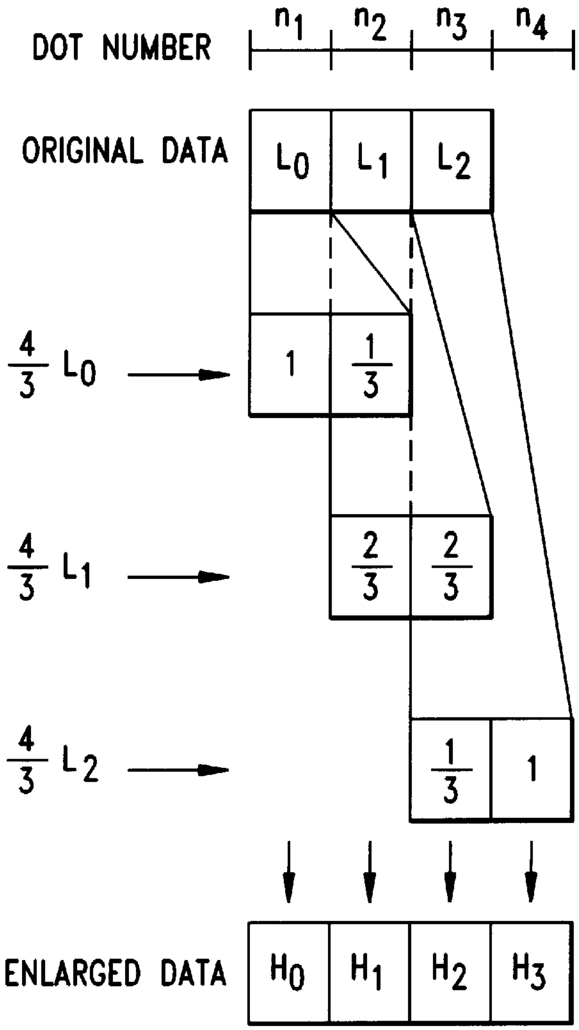
FIG.24 PRIOR ART
FIG. 24 shows a conventional image enlargement method.
Figure 25:
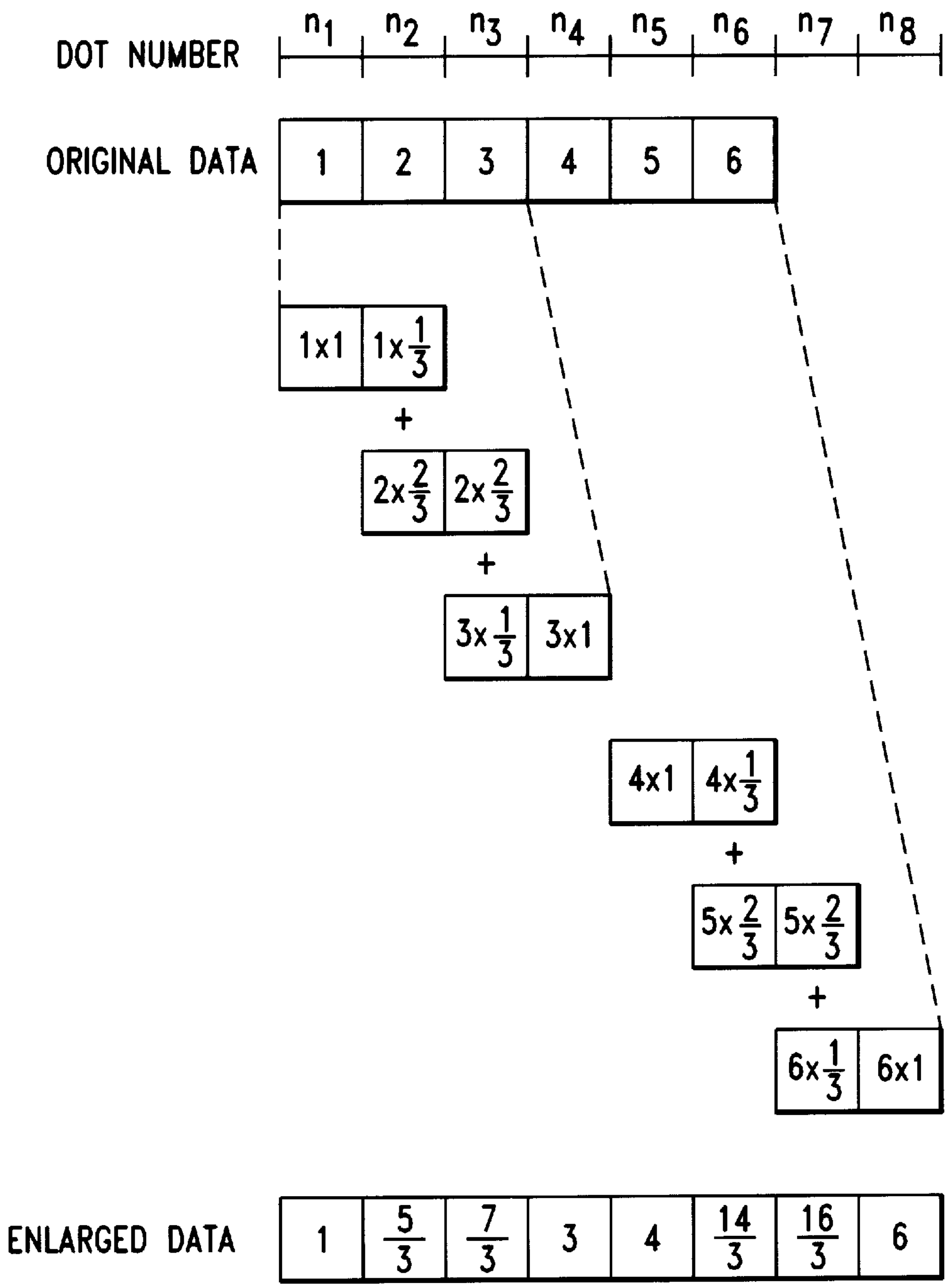
FIG.25 PRIOR ART
FIG. 25 shows a conventional image enlargement method.

The timing for mathematic operations for horizontal data is described with reference to FIG. 22. FIG. 22 uses as an example, mathematic operations for blue (B) in the horizontal enlargement at a ratio of 4/3 described in the first embodiment with reference to FIG. 3. Blue gradation data BL0, BL1, BL2, BL3, . . . is sequentially input from the system unit to the gamma conversion table in the horizontal enlargement block 4 at a data cycle of, for example, 40 ns, where the data is converted to brightness data. The brightness data BL0 is mathematically operated on by the operation table 16, and the results of the operations (1) BL0 and (1/3) BL0 are each input to a data timing latch 18 where the clock is applied to the results, resulting in brightness data with a data cycle of 30 ns. The brightness data (1) BL0 is input to the input 1 of the adder 28 via the shifter 22, and output directly as the output data BH0 of the adder 28. On the other hand, the brightness data (1/3) BL0 is input to the latch 8 and then to the input 2 of the adder 28 via the shifter 26. At this point, the input 1 of the adder 28 has therein the result of the operation (2/3) BL1 on the next data BL1 performed by the mathematic operation table, so the output of the adder 28 is (1/3) BL0+(2/3) BL1. In this manner, the BH0, BH1, BH2, . . . are sequentially operated on and stored in the memory 30.

Various modifications other than the above embodiments may be made to this invention.

For example, this invention is not limited to the liquid crystal display apparatus and is applicable to other flat display apparatuses such as plasma display apparatuses.

In addition, although this invention has been implemented on the liquid crystal display apparatus, it is of course possible to implement the configuration described in “3-3. Configuration of the apparatus” on a system such as a personal computer.

As described above, this invention can display an image enlarged using color subpixels R, G, and B as references, display the outline of the enlarged image smoothly, and in particular, display the outline of enlarged characters (fonts) beautifully.

I claim:

1. A liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in a matrix, characterized by the steps of:

forming six pieces of enlarged display brightness data arranged in the order of R-G-B-R-G-B, G-B-R-G-B-R, or B-R-G-B-R-G and to which weights of brightness of [1/3, 2/3, 1, 1, 2/3, 1/3] are applied, respectively, based on three pieces of raw-direction original display brightness data to be displayed in the three subpixels comprising one of said display dots; and sequentially outputting said enlarged display brightness data to the six subpixels to enlarge the original image in the raw direction of said display panel.

2. A liquid crystal display method according to claim 1 characterized in that:

said weighting and addition of brightness are carried out after said original display brightness data is subjected to gamma (Γ) conversion so as to be converted from gradation data to brightness data.

3. A liquid crystal display method according to claim 2 characterized in that:

after said weighting and addition of brightness, the data is subjected to gamma reverse (Γ−1) conversion so as to be converted from brightness data to gradation data.

4. A liquid crystal display method according to claim 3 characterized in that:

said gamma reverse conversion is executed by selecting among a plurality of gamma conversion tables corresponding to changes in the visual angle.

5. A liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in a matrix, characterized by the steps of:

forming first enlarged display brightness data comprising six pieces of enlarged display brightness data arranged in the order of R-G-B-R-G-B in the raw direction and to which weights of brightness of [1/3, 2/3, 1, 1, 2/3, 1/3] are applied, respectively, based on three pieces of raw-direction original display brightness data to be displayed in three subpixels constituting a first display dot;

forming second enlarged display brightness data comprising six pieces of enlarged display brightness data arranged in the order of G-B-R-G-B-R in the raw direction and to which weights of brightness of [1/3, 2/3, 1, 1, 2/3, 1/3] are applied, respectively, based on three pieces of raw-direction original display brightness data to be displayed in three subpixels constituting a second display dot adjacent to said first display dot;

forming third enlarged display brightness data comprising six pieces of enlarged display brightness data arranged in the order of B-R-G-B-R-G in the raw direction and to which weights of brightness of [1/3, 2/3, 1, 1, 2/3, 1/3] are applied, respectively, based on three pieces of raw-direction original display brightness data to be displayed in three subpixels constituting a third display dot adjacent to said second display dot;

adding said first to third enlarged display brightness data to each other to combine them in data regions of the same color to which weights of brightness of 1/3 and 2/3 are applied, respectively, and sequentially outputting to the subpixels said enlarged display brightness data formed by combination to enlarge the original image 4/3 times in the raw direction of said display panel.

6. A liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in a matrix, characterized by the steps of:

enlarging three pieces of raw-direction original display brightness data to be displayed in three subpixels constituting a first display dot, to six pieces of first enlarged display brightness data including single-color data at one end the brightness of which is reduced to half and two pieces of data of two other colors at the other end the brightness of which is reduced to half;

enlarging three pieces of raw-direction original display brightness data to be displayed in three subpixels constituting a second display dot adjacent to said first display dot, to six pieces of second enlarged display brightness data including at one end, two pieces of data of the same two colors as in the other end of said first enlarged display brightness data the brightness of which is reduced to half and at the other end, one piece of data of the same color as in the one end of said first enlarged display brightness data the brightness of which is reduced to half;

adding the two pieces of data at the other end of said first enlarged display brightness data to the two pieces of data at the one end of said second enlarged display brightness data, or the data at the one end of said first enlarged display brightness data to the data at the other end of said second enlarged display brightness data to combine said first and second enlarged display brightness data, and sequentially repeating this sequence of operations; and thereby sequentially outputting to the subpixels said enlarged display brightness data formed by combination to enlarge the original image 3/2 times in the raw direction of said display panel.

7. A liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in a matrix, comprising the steps of:

forming first enlarged display brightness data comprising six pieces of enlarged display brightness data arranged in the order of R-G-B-R-G-B, G-B-R-G-B-R, or B-R-G-B-R-G in the raw direction and to which weights of brightness of [½, 1, 1, 1, ½, ½] are applied, respectively, based on three pieces of raw-direction original display brightness data to be displayed in three subpixels constituting a first display dot;

forming second enlarged display brightness data comprising six pieces of enlarged display brightness data arranged in the order of G-B-R-G-B-R, B-R-G-B-R-G, or R-G-B-R-G-B in the raw direction and to which weights of brightness of [½, ½, 1, 1, 1, ½] are applied, respectively, based on three pieces of raw-direction original display brightness data to be displayed in three subpixels constituting a second display dot adjacent to said first display dot, the fifth and sixth pieces of said first enlarged display brightness data corresponding in color to the first and second pieces of said second enlarged display brightness data, respectively;

adding the fifth and sixth pieces of said first enlarged display brightness data to the first and second pieces of said second enlarged display brightness data, respectively to combine said first and second enlarged display brightness data, and sequentially outputting to the subpixels said enlarged display brightness data formed by combining to enlarge the original image 3/2 times in the raw direction of said display panel.

8. A liquid crystal display method for displaying an enlarged image on a display panel of a color liquid crystal display apparatus in which display dots each comprising a subplxel displaying red (R), a subpixel displaying green (G), and a subpixel displaying blue (B) placed in this order are arranged in a matrix, comprising:

a first step of forming first enlarged display brightness data comprising six pieces of enlarged display brightness data arranged in the order of R-G-B-R-G-B in the raw direction and to which weights of brightness of [1/3, 2/3, 1, 1, 2/3, 1/3] are applied, respectively, based on three pieces of raw-direction original display brightness data to be displayed in three subpixels constituting a first display dot;

a second step of forming second enlarged display brightness data comprising six pieces of enlarged display brightness data arranged in the order of G-B-R-G-B-R in the raw direction and to which weights of brightness of [1/3, 2/3, 1, 1, 2/3, 1/3] are applied, respectively, based on three pieces of raw-direction original display brightness data to be displayed in three subpixels constituting a second display dot following said first display dot;

a third step of forming third enlarged display brightness data comprising six pieces of enlarged display brightness data arranged in the order of B-R-G-B-R-G in the raw direction and to which weights of brightness of [1/3, 2/3, 1, 1, 2/3, 1/3] are applied, respectively, based on three pieces of raw-direction original display brightness data to be displayed in three subpixels constituting a third display dot following said second display dot;

a fourth step of forming supplementary enlarged display brightness data comprising five pieces of data arranged in the order of R-G-B-R-G, G-B-R-G-B, or B-R-G-B-R and to which weights of brightness of [1/3, 2/3, 1, 2/3, 1/3] are applied, respectively, based on three pieces of raw-direction original display brightness data to be displayed in three subpixels constituting a fourth display dot positioned at one of the following four positions: before said first display dot; between said first and second display dots; between said second and third display dots; and after said third display dot;

a fifth step of adding said first to fourth enlarged display brightness data to each other to combine them in data regions of the same color to which weights of brightness of 1/3 and 2/3 are applied, respectively, and sequentially outputting to said subpixels said enlarged display brightness data formed by sequentially repeating said first to fifth steps to enlarge the original image (M+1)/M times in the raw direction of said display panel, where M is a natural number and M/≧4.

9. A liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in a matrix, comprising:

at least one first step of forming first enlarged display brightness data comprising six pieces of enlarged display brightness data arranged in the order of R-G-B-R-G-B in the raw direction and to which weights of brightness of [1/3, 2/3, 1, 1, 2/3, 1/3] are applied, respectively, based on three pieces of raw-direction original display brightness data to be displayed in three subpixels constituting at least one first display dot;

at least one second step of forming second enlarged display brightness data comprising six pieces of enlarged display brightness data arranged in the order of G-B-R-G-B-R in the raw direction and to which weights of brightness of [1/3, 2/3, 1, 1, 2/3, 1/3] are applied, respectively, based on three pieces of raw-direction original display brightness data to be displayed in three subpixels constituting at least one second display dot following said at least one first display dot;

at least one third step of forming third enlarged display brightness data comprising six pieces of enlarged display brightness data arranged in the order of B-R-G-B-R-G in the raw direction and to which weights of brightness of [1/3, 2/3, 1, 1, 2/3, 1/3] are applied, respectively, based on three pieces of raw-direction original display brightness data to be displayed in three subpixels constituting at least one third display dot following said at least one second display dot;

at least one fourth step of forming supplementary enlarged display brightness data comprising seven pieces of data arranged in the order of R-G-B-R-G-B-R, G-B-R-G-B-R-G, or B-R-G-B-R-G-B and to which weights of brightness of [1/3, 2/3, 1, 1, 1, 2/3, 1/3] are applied, respectively, based on three pieces of raw-direction original display brightness data to be displayed in three subpixels constituting at least one fourth display dot positioned at one of the following three positions: before said at least one first display dot; between two of said display dots that are adjacent to each other; and after said at least one third display dot;

a fifth step of adding said first to fourth enlarged display brightness data to each other to combine them in data regions of the same color to which weights of brightness of 1/3 and 2/3 are applied, respectively, and sequentially outputting to said subpixels said enlarged display brightness data formed by sequentially repeating said first to fifth steps to enlarge the original image M/N times in the raw direction of said display panel, where M and N are natural numbers and M≧N+2.

10. A liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in a matrix, comprising:

at least one first step of forming first enlarged display brightness data comprising six pieces of enlarged display brightness data arranged in the order of R-G-B-R-G-B in the raw direction and to which weights of brightness of [1/3, 2/3, 1, 1, 2/3, 1/3] are applied, respectively, based on three pieces of raw-direction original display brightness data to be displayed in three subpixels constituting at least one first display dot;

at least one second step of forming second enlarged display brightness data comprising six pieces of enlarged display brightness data arranged in the order of G-B-R-G-B-R in the raw direction and to which weights of brightness of [1/3, 2/3, 1, 1, 2/3, 1/3] are applied, respectively, based on three pieces of raw-direction original display brightness data to be displayed in three subpixels constituting at least one second display dot following said at least one first display dot;

at least one third step of forming third enlarged display brightness data comprising six pieces of enlarged display brightness data arranged in the order of B-R-G-B-R-G in the raw direction and to which weights of brightness of [1/3, 2/3, 1, 1, 2/3, 1/3] are applied, respectively, based on three pieces of raw-direction original display brightness data to be displayed in three subpixels constituting at least one third display dot following said at least one second display dot;

at least one fourth step of forming supplementary enlarged display brightness data comprising eight pieces of data arranged in the order of R-G-B-R-G-B-R-G, G-B-R-G-B-R-G-B, or B-R-G-B-R-G-B-R and to which weights of brightness of [1/3, 2/3, 1, 1, 1, 1, 2/3, 1/3] are applied, respectively, based on three pieces of raw-direction original display brightness data to be displayed in three subpixels constituting at least one fourth display dot positioned at one of the following three positions: before said at least one first display dot; between two of said display dots that are adjacent to each other; and after said at least one third display dot;

a fifth step of adding said first to fourth enlarged display brightness data to each other to combine them in data regions of the same color to which weights of brightness of 1/3 and 2/3 are applied, respectively, and sequentially outputting to said subpixels said enlarged display brightness data formed by sequentially repeating said first to fifth steps to enlarge the original image M/N times in the raw direction of said display panel, where M and N are natural numbers and $M \geqq N+2$.

11. A liquid crystal display method for enlarging the number of lines of an original image by a ratio of (1+M/N) to produce an enlarged image, where M and N are natural numbers, comprising the steps of:

converting each successive line of the original image into a group of line constituents of the enlarged image, the first and last lines of the original image being both converted into groups of three line constituents weighted [M/2N, 1, M/2N] and remaining lines of the original image being converted into successive groups of two line constituents weighted [1−((2n−1)M/2N), (2n+1)M/2N] where n is a natural number; and adding the last line constituent of a group to the first line constituent of a next successive group to form a display line of the enlarged image.

12. A liquid crystal display method for displaying an enlarged image on a display panel of a color liquid crystal display apparatus in which display dots each comprising a subpixel displaying red (R), a subpixel displaying green (G), and a subpixel displaying blue (B) placed in this order are arranged in matrix, characterized by the steps of:

forming six pieces of first enlarged display brightness data [(1/3) RL0, (2/3) GL0, (1) BL0, (1) RL0, (2/3) GL0, (1/3) BL0] by weighting and enlarging in the raw direction, three pieces of raw direction original display brightness data [RL0 (red) GL0 (green), BL0 (blue)], where RL0, GL0 and BL0 are three subpixels constituting a first display dot;

forming six pieces of second enlarged display brightness data [(1/3) GL1, (2/3) BL1, (1) RL1, (1) GL1, (2/3) BL1, (2/3) RL1] by weighting and enlarging in the raw direction, three pieces of raw direction original display brightness data [RL1, GL1, BL1, where RL1, GL1 and BL1] are three subpixels constituting a second display dot adjacent to said first display dot;

forming six pieces of third enlarged display brightness data [(1/3) BL2, (2/3) RL2, (1) GL2, (1) BL2, (2/3) RL2, (1/3) GL2] by weighting and enlarging in the raw direction, three pieces of raw direction original display brightness data [RL2, GL2, BL2] , where RL2, GL2 and BL2 are three subpixels constituting a third display dot adjacent to said second display dot;

adding the fifth and sixth pieces of said first enlarged display brightness data [(2/3) GL0, (1/3) BL0] to the first and second pieces of said second enlarged display brightness data [(1/3) GL3, (2/3) BL1], respectively, to combine said first and second enlarged display brightness data;

adding the fifth and sixth pieces of said second enlarged display brightness data [(2/3) BL1, (1/3) RL1] to the first and second pieces of said third enlarged display brightness data [(1/3) BL2, (2/3) RL2], respectively, to combine said second and third enlarged display brightness data;

adding the fifth and sixth pieces of said third enlarged display brightness data [(2/3) RL2, (1/3) GL2] to first and second pieces of a next, enlarged display brightness data [(1/3) RLX, (2/3) GLX], respectively, where RLX and GLX are two subpixels of a next display dot adjacent to said third display dot, to combine said third and next enlarged display brightness data, and sequentially repeating this sequence of operations; and thereby sequentially outputting to the subpixels said enlarged display brightness data formed by combination to enlarge the original image 4/3 times in the raw direction of said display panel.

* * * * *